United States Patent
Brimijoin, II et al.

(10) Patent No.: US 10,873,825 B2
(45) Date of Patent: *Dec. 22, 2020

(54) AUDIO SPATIALIZATION AND REINFORCEMENT BETWEEN MULTIPLE HEADSETS

(71) Applicant: Facebook Technologies, LLC, Menlo Park, CA (US)

(72) Inventors: William Owen Brimijoin, II, Kirkland, WA (US); Philip Robinson, Seattle, WA (US); Andrew Lovitt, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,796

(22) Filed: May 26, 2020

(65) Prior Publication Data

US 2020/0359158 A1 Nov. 12, 2020

Related U.S. Application Data

(63) Continuation of application No. 16/405,950, filed on May 7, 2019, now Pat. No. 10,708,706.

(51) Int. Cl.
*H04S 7/00* (2006.01)
*G06F 3/01* (2006.01)
*G06F 3/16* (2006.01)

(52) U.S. Cl.
CPC ............. *H04S 7/304* (2013.01); *G06F 3/012* (2013.01); *G06F 3/013* (2013.01); *G06F 3/16* (2013.01); *H04S 2420/00* (2013.01)

(58) Field of Classification Search
CPC ...... H04S 7/304; H04S 2420/00; G06F 3/016; G06F 3/013; G06F 3/012
See application file for complete search history.

(56) References Cited

U.S. PATENT DOCUMENTS 8,718,301 B1 5/2014 Jouppi et al.
9,451,210 B1 9/2016 Smus
(Continued)

OTHER PUBLICATIONS

PCT International Search Report and Written Opinion, PCT Application No. PCT/US2020/031406, dated Aug. 11, 2020, 13 pages.
(Continued)

*Primary Examiner* — Regina N Holder
(74) *Attorney, Agent, or Firm* — Fenwick & West LLP

(57) ABSTRACT

A shared communication channel allows for the transmitting and receiving audio content between multiple users. Each user is associated with a headset configured to transmit and receive audio data to and from headsets of other users. After the headset of a first user receives audio data corresponding to a second user, the headset spatializes the audio data based upon the relative positions of the first and second users such that when the audio data is presented to the first user, the sounds of the audio data appear to originate at a location corresponding to the second user. The headset reinforces the audio data based upon a deviation between the location of the second user and a gaze direction of the first user, allowing for the first user to more clearly hear audio data from other users that they are paying attention to.

20 Claims, 8 Drawing Sheets

(56) References Cited

U.S. PATENT DOCUMENTS

| | | |
|---|---|---|
| 9,832,587 B1 | 11/2017 | Park et al. |
| 10,304,476 B2 | 5/2019 | Glasgow et al. |
| 10,360,894 B1 | 7/2019 | Rakshit et al. |
| 10,555,106 B1 | 2/2020 | Mehra |
| 10,708,706 B1 * | 7/2020 | Brimijoin, II .......... G06F 3/013 |
| 2019/0087000 A1 | 3/2019 | Ricknas et al. |
| 2019/0289416 A1 | 9/2019 | York et al. |

OTHER PUBLICATIONS

Brimijoin, WO. et al., "Mic Up! A proposed head-controlled multi-channel wireless system for hearing aids," MRC/CSO Institute of Hearing Research, 1 page.

Furness, D.N., "Abstracts of the Fourth Joint Annual Conference, Experimental and Clinical Short Papers Meetings of the British Society of Audiology," International Journal of Audiology, 2014, vol. 53, No. 9, 57 pages.

Hart, J. et al., "The Attentive Hearing Aid: Eye Selection of Auditory Sources for Hearing Impaired Users," International Federation for Information Processing Conference on Human-Computer Interaction, 2009, pp. 19-35.

Porschmann, C., "Influences of Bone Conduction and Air Conduction on the Sound of One's Own Voice," Acustica, 2000, vol. 86, pp. 1038-1045.

Robinson, P.W. et al., "Echo thresholds for reflections from acoustically diffusive architectural surfaces," The Journal of the Acoustical Society of America, 2013, vol. 2755, 11 pages.

Whitmer, WM. et al., "The speech intelligibility benefit of a unilateral wireless system for hearing impaired adults," International Journal of Audiology., Dec. 2011, vol. 50, No. 12, 14 pages.

\* cited by examiner

AUDIO SPATIALIZATION AND REINFORCEMENT BETWEEN MULTIPLE HEADSETS

CROSS REFERENCE TO RELATED APPLICATIONS

This application is a continuation of co-pending U.S. application Ser. No. 16/405,950, filed May 7, 2019, which is incorporated by reference in its entirety.

BACKGROUND

The present disclosure generally relates to audio communication between users on a shared communication channel, and specifically relates to spatialization and reinforcement of audio signals transmitted between multiple different users of the shared communication channel.

In environments with multiple sound sources, a listener may encounter trouble tuning into a particular sound source while tuning out sources from other sound sources. For example, in a busy room with multiple people speaking at the same time, it can be difficult for a listener to discern the words of a particular speaker over the sounds of the other speakers in the room. This phenomenon is known as the cocktail party problem. In some cases, different sound sources, e.g., speakers, may have microphones that records their speech, which is transmitted to the listener to hear. However, it may be difficult for the listener to decipher a source of the sound, especially when a large number of sound sources are present, or to switch their attention between different sound sources.

SUMMARY

Embodiments relate to the establishment of a shared communication channel for transmitting and receiving audio content between multiple users. Each user is associated with a headset configured to transmit and receive audio data to and from headsets of other users. A headset of a first user, in response to receiving audio data corresponding to a second user, spatializes the audio data based upon the relative positions of the first and second users such that the audio data is presented to the first user appears to originate at a location corresponding to the second user. The headset may also reinforce the audio data based upon a deviation between the location of the second user and a reinforcement direction, such as a gaze direction of the first user, allowing for the first user to more clearly hear audio data from other users that they are paying attention to.

In some embodiments, a headset is described. The headset comprises a gaze determination system configured to determine a gaze direction of a first user wearing the headset. The headset further comprises a receiver configured to receive audio data associated with a second user, the audio data comprising an audio output signal. The headset further comprises processing circuitry configured to identify a relative position associated with the second user relative to the first user, and to determine a deviation of the identified relative position of the second user relative to the gaze direction of the first user. The processing circuitry spatializes the audio output signal associated with the second user, based upon the relative position associated with the second user. The processing circuitry may further, responsive to the deviation of the identified position of the second user relative to the gaze direction of the first user being within a threshold amount, reinforce an amplitude of the audio output signal based upon the deviation. The headset further comprises an audio output interface configured to send the spatialized and reinforced audio output signal to one or speakers to produce an output sound, such that the output sound is rendered to the first user such that the output sound is perceived as originating at the position of the second user.

The method may be performed by an audio system. For example, an audio system that is part of a headset (e.g., near-eye display, head-mounted display). The audio system includes a microphone assembly, a transceiver, a controller, and a speaker assembly (e.g., a loudspeaker array).

Embodiments according to the invention are in particular disclosed in the attached claims directed to a headset, a method, and a storage medium, wherein any feature mentioned in one claim category, e.g. headset, can be claimed in another claim category, e.g. method, storage medium, system, and computer program product as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment, a headset may comprise:
a gaze determination circuit configured to determine a gaze direction of a first user of the headset;
a transceiver configured to receive an audio signal associated with a headset of a second user;
processing circuitry configured to:
determine a relative position associated with the second user relative to the first user;
determine a deviation a position of the second user relative to a reinforcement direction of the first user, wherein the reinforcement direction is based at least in part upon the gaze direction of the first user;
spatialize the audio signal associated with the second user, based at least in part upon the relative position associated with the second user; and
reinforce an amplitude of the audio output signal, based at least in part upon the deviation of the identified position of the second user relative to the reinforcement direction of the first user; and a speaker assembly configured to project a sound based upon the spatialized and reinforced audio output signal, such that the projected sound is perceived as originating at the position of the second user.

In an embodiment, a headset may comprise a microphone array comprising a plurality of microphones arranged in a plurality of different locations, the microphone array may be configured to capture sound in a local area of the first user and generate an audio input signal.

The processing circuitry may be configured to:
analyze the audio input signal to identify sounds originating from a particular region in the local area of the first user; and generate a user audio signal from the audio input signal by reinforcing the portion of the audio input signal corresponding to the sounds originating from the particular region.

The particular region may correspond to a mouth of the first user.

The transceiver may be configured to receive positional information of the second user.

In an embodiment, a headset may comprise an antenna array configured to determine the relative position associated with the second user relative to the first user.

The processing circuitry may be configured to spatialize the audio output signal based upon whether there is line of sight between the first user and the second user.

The gaze determination circuit may be configured to:
receive a position of the first user, the position comprising at least a head orientation of the first user; and
determine a relative orientation of the first user's eyes relative to the first user's head; and wherein spatializing the audio output signal associated with the second user is based upon a relative direction of the position of the second user to the head orientation of the first user.

The receiver may be configured to receive a second audio signal from a third user, and the processing circuitry may be configured to:
identify a relative position associated with the third user relative to the first user;
determine a deviation of the identified relative position of the third user relative to the reinforcement direction of the first user;
compare the deviation of the identified relative position of the third user to the deviation of the identified relative position of the second user; and
reinforce an amplitude of the second audio signal associated with the third user based upon a result of the comparison.

In an embodiment, a method may comprise:
determining, at a headset of a first user, a reinforcement direction of the first user;
receiving, at a headset of a first user, an audio signal associated with a headset of a second user;
identifying a relative position associated with the second user relative to the first user;
determining a deviation of the identified relative position of the second user relative to the reinforcement direction of the first user;
spatializing the audio signal associated with the second user, based at least in part upon the relative position associated with the second user; and
reinforcing an amplitude of the audio output signal, based at least in part upon the deviation of the identified position of the second user relative to the reinforcement direction of the first user; and
projecting a sound based upon the spatialized and reinforced audio output signal, such that the projected sound is perceived as originating at the position of the second user.

In an embodiment, a method may comprise using a microphone array comprising a plurality of microphones arranged in a plurality of different locations to capture sound in a local area of the first user and generate an audio input signal.

In an embodiment, a method may comprise:
analyzing the audio input signal to identify sounds originating from a particular region in the local area of the first user;
generating a user audio signal from the audio input signal by reinforcing the portion of the audio input signal corresponding to the sounds originating from the particular region.

The particular region may correspond to a mouth of the first user.

In an embodiment, a method may comprise receiving positional information of the second user.

In an embodiment, a method may comprise receiving, at an antenna array, a signal from a headset of the second user, and determining the relative position associated with the second user relative to the first user based upon the received signals.

Spatializing the audio output signal may be based upon whether there is line of sight between the first user and the second user.

Determining a reinforcement direction of the first user may comprise determining a gaze direction of the first user by:
receiving a position of the first user, the position comprising at least a head orientation of the first user;
determining a relative orientation of the first user's eyes relative to the first user's head; and
determining the gaze direction based upon the head orientation and relative orientation of the first user's eyes relative to the first user's head; and
wherein spatializing the audio output signal associated with the second user is based upon a relative direction of the position of the second user to the orientation of the first user.

In an embodiment, a method may comprise:
receiving a second audio signal from a third user;
identifying a relative position associated with the third user relative to the first user;
determining a deviation of the identified relative position of the third user relative to the reinforcement direction of the first user;
comparing the deviation of the identified relative position of the third user to the deviation of the identified relative position of the second user; and
reinforcing an amplitude of the second audio signal associated with the third user based upon a result of the comparison.

In an embodiment, a non-transitory computer-readable medium may store instructions that, when executed by one or more processors, may cause the one or more processors to perform operations comprising:
determining, at a headset of a first user, a reinforcement direction of the first user;
receiving, at a headset of a first user, an audio signal associated with a headset of a second user;
identifying a relative position associated with the second user relative to the first user;
determining a deviation of the identified relative position of the second user relative to the reinforcement direction of the first user;
spatializing the audio signal associated with the second user, based at least in part upon the relative position associated with the second user; and
reinforcing an amplitude of the audio output signal, based at least in part upon the deviation of the identified position of the second user relative to the reinforcement direction of the first user; and
projecting a sound based upon the spatialized and reinforced audio output signal, such that the projected sound is perceived as originating at the position of the second user.

Determining the reinforcement direction of the first user may comprise determining a gaze direction of the first user by:
receiving a position of the first user, the position comprising at least a head orientation of the first user;
determining a relative orientation of the first user's eyes relative to the first user's head; and
determining the gaze direction based upon the head orientation and relative orientation of the first user's eyes relative to the first user's head; and wherein spatializing the audio output signal associated with the second user is based upon a relative direction of the position of the second user to the orientation of the first user.

In an embodiment, one or more computer-readable non-transitory storage media may embody software that is operable when executed to perform a method according to or within any of the above mentioned embodiments.

In an embodiment, a system may comprise: one or more processors; and at least one memory coupled to the processors and comprising instructions executable by the processors, the processors operable when executing the instructions to perform a method according to or within any of the above mentioned embodiments.

In an embodiment, a computer program product, preferably comprising a computer-readable non-transitory storage media, may be operable when executed on a data processing system to perform a method according to or within any of the above mentioned embodiments.

Figure 1:
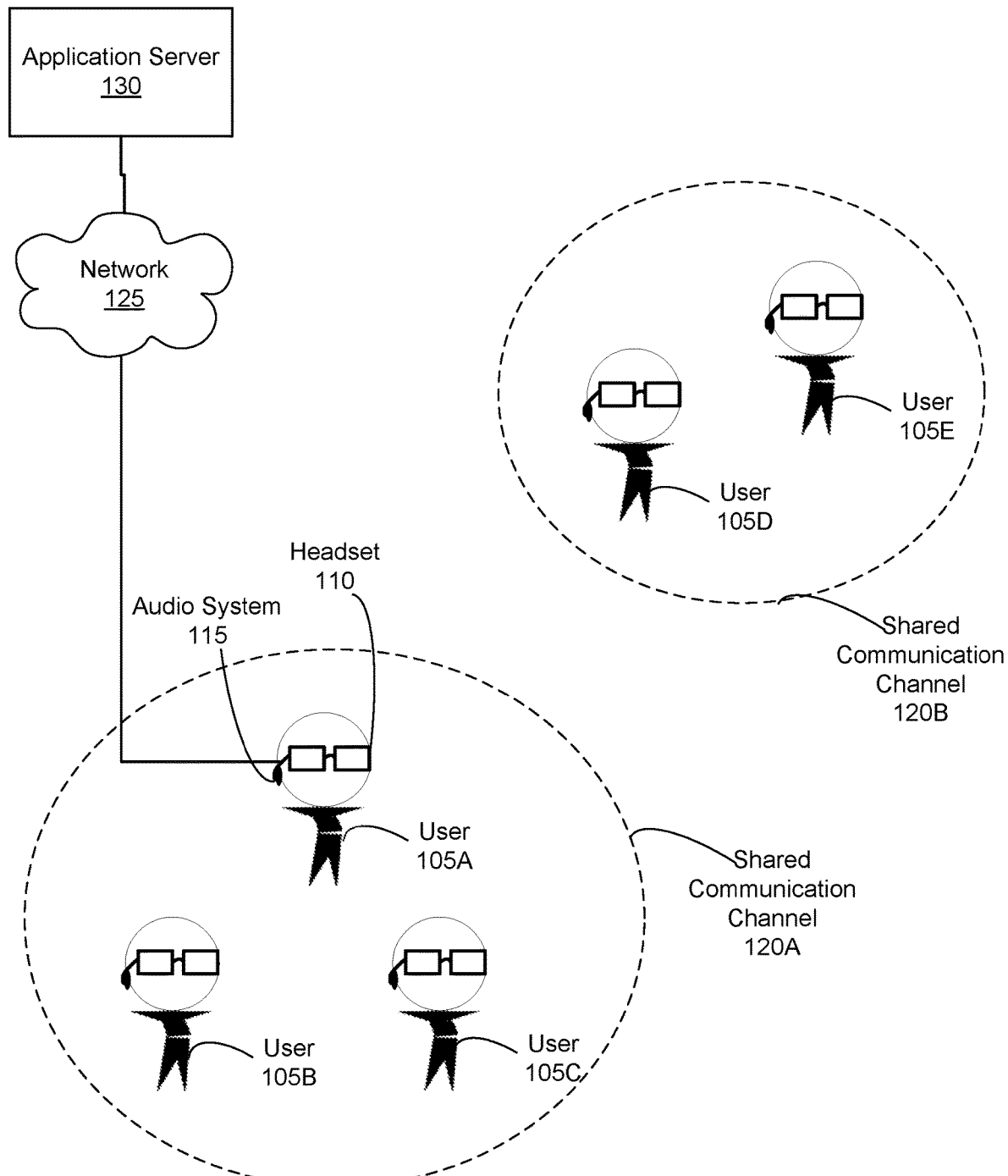
FIG. 1 illustrates a high level diagram of an environment in which a system for audio spatialization and reinforcement may be used, in accordance with one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments relate to a headset having an audio system that is configured to receive audio signals from multiple audio sources, and to play back the received audio signals to a user (e.g., a wearer of the headset). The audio system spatializes the audio signal received from a particular audio source based upon a relative location of the audio source, such that the audio signal played back to the user appears to originate from the location of the audio source. In some embodiments, the audio system reinforces the audio signal received from the audio source based upon the location of the audio source and a reinforcement direction (e.g., a gaze direction) of the user, in order to emphasize the audio data received from certain audio sources, and allow the user to switch their attention between different audio sources.

In some embodiments, a shared communication channel is established between a plurality of users within a local area. Each wears a headset comprising a transceiver for communicating with other users in the shared communication channel (e.g., transmitting and receiving audio signals). Each headset also includes sensors configured to track a position and gaze direction of its user, which can be used to determine relative positions of the other users of the shared communication channel, as well as how the positions of the other users relate to the gaze direction of the user.

The headset processes audio signals received from other users of the shared communication network based on the relative positions of the other users of the shared communication channel, such that the audio signals, when played back to the user, will appear to originate from locations corresponding to the other users. Audio signals are also reinforced based upon the reinforcement direction of the user (which may be based upon a gaze direction of the user, and can be used to infer which other users the user is paying attention to) where audio signals from other users at locations aligned with the reinforcement direction of the user may be reinforced more strongly. For example, a first user receives audio signals from each of the other users of the shared communication channel, which are spatialized to indicate a relative position of each of the other users to the first users, and reinforced based upon which of the other users the first user is currently looking at (e.g., as determined by gaze direction).

In addition, the headset includes a microphone for recording the user's own speech. The user's own speech can then be transmitted to the headsets of other users in the shared communication channel. Furthermore, the user's own speech may in some embodiments be played back to the user, to assist the user in regulating the volume of their own voice.

Various embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 illustrates a high level diagram of an environment including an audio system 115, in accordance with one or more embodiments. The audio system 115 may be integrated as part of a headset 110, which may be worn by a user 105A.

The user 105A wearing the headset 110 containing the audio system 115 is within an environment in proximity to a plurality of other users (users 105B, 105C, 105D, and 105E). The users 105A-E may be collectively referred to as the users 105. The users may speak to each other, and as such may each be considered to correspond to an audio source. In addition, additional audio sources may be present in the environment. In environments with a large number of audio sources in proximity to each other, it may be difficult for the user 105A to focus on any particular audio source (e.g., speech by a specific other user in the environment).

In order to facilitate conversation between users in the environment, each user may be wearing a respective headset having a respective audio system. The audio system 115 communicates with the audio systems of the other headsets to receive audio signals corresponding to the speech of the other users, and plays back the audio signals to the user 105A. This may allow the user 105A to more clearly hear the speech of the other users. In addition, the audio system 115 processes the received audio signals such that the audio signals played back to the user 105 are spatialized such that the played sound is perceived as originated from the locations of the other users. The played back audio signal may also be reinforced, based upon which of the other users the user 105 is currently looking at.

In some embodiments, a plurality of users may establish a shared communication channel. For example, FIG. 1 illustrates a first shared communication channel 120A having three users, and a second shared communication channel 120B having two users. A shared communication channel 120 may correspond to a particular group of users that wish to have conversations with each other. For example, a shared communication channel 120 may include a number of users within a certain proximity of each other (e.g., seated at the same table). As used herein, a shared communication channel may refer to a grouping of multiple users each associated with a corresponding audio system, where the audio system of each user is able to communicate with the audio systems of each of the other users within the grouping. For example, each of the three users 105A, 105B, and 105C of the shared communication channel 120A have respective audio systems that communicate with each other, while each of the two users 105D and 105E of the shared communication channel 120B have respective audio systems that communicate with each other.

In some embodiments, a shared communication channel may include one or more remote users. A shared communication channel may include a plurality of users within a particular geographic area (e.g., corresponding to a particular room, building, etc.). In some embodiments, the geographic area may be defined based upon one or more structures, such as walls. As used herein, a remote user may correspond to a user participating in the shared communication channel who is located outside the geographic area corresponding to the channel. For example, a shared communication channel may comprise a group of users seated at a common table, as well as one or more additional remote users who are located in a different building.

Although FIG. 1 illustrates each shared communication channel 120A and 120B as corresponding to distinct regions, in some embodiments, different shared communication channels cover overlapping regions. For example, users of the shared communication channel 120B may be intermingled with users of the shared communication channel 120A within a common region. In some embodiments, a particular user may be part of more than one shared communication channel (e.g., both shared communication channels 120A and 120B).

In some embodiments, a shared communication channel 120 may be established by a group of one or more users through an exchange of information. For example, a first user may join a common shared communication channel with a second user by scanning (e.g., using their respective headsets 110 or other scanning device) information corresponding to the second user (e.g., based upon a headset worn by the second user, or a scannable object such as a badge). In some embodiments, the shared communication channel is implemented as part of a peer to peer network established between at least the headsets of the first and second users.

In some embodiments, one or more users 105 access an application server 130 via a network 125. The network may comprise the Internet, a local area network (LAN), a wide area network (WAN), a mobile wired or wireless network, a private network, a virtual private network, or a combination thereof.

The application server 130 contains one or more applications that facilitate communications between the headsets of different users, and may correspond to an online system, a local console, or some combination thereof. For example, the application server 130 may contain applications that establish a shared communication channel between two or more users, and maintain metadata corresponding to established shared communication channels. may comprise an online system. Each user may log on to the online system on the application server 130, and indicate one or more other users they wish to communicate with. In some embodiments, a connection between two users 105 may be established if both users indicate a desire to communicate with the other user. A shared communication channel may be formed for each group of users in which each user of the group is connected to each of the other users of the group.

In other embodiments, a first user may establish a shared communication channel 120, which may then be joined by additional users. For example, the first user may provide to each of the additional users a passcode or other type of authentication to allow the additional users to join the shared communication channel via the application server 130 (e.g., providing the passcode verbally or in writing to the additional users, or transmitting the passcode to the headsets of the additional users indicated by the first user via a user interface). In some embodiments, the application server 130 maintains the shared communication channel 120, and transmits to the headsets of each user of the channel updates regarding a current status of the channel (e.g., if a new user joins the channel, or if an existing user exits the channel). In some embodiments, the application server 130 is used to maintain information corresponding to the shared communication channel 120 and to transmit current status information concerning the shared communication channel to the headsets of each user, while the communication of audio data between the headsets may be performed peer-to-peer.

In some embodiments, the application server 130 comprises a social networking system. The social networking system may maintain a social graph or other data structure indicating relationships between different users (e.g., friend connections). In some embodiments, only users having a particular type of relationship on the social networking system may establish a connection with each other to form a shared communication channel. In some embodiments, the social graph maintained by the application server 130 may be used to automatically establish a shared communication channel 120 between multiple users. For example, a group of users all located within a particular geographic area and who all have a particular type of social network relationship with each may be automatically included in a shared communication channel.

In some embodiments, some or all of the functions of the application server 130 may be performed by a local console. For example, the local console may connect to multiple headsets 110 corresponding to different users 105 in a local environment, and establish and maintain one or more shared communication channels between groups of the users in the environment. In some embodiments, one or more headsets 105 may connect to the application server 130 through a local console.

Figure 2:
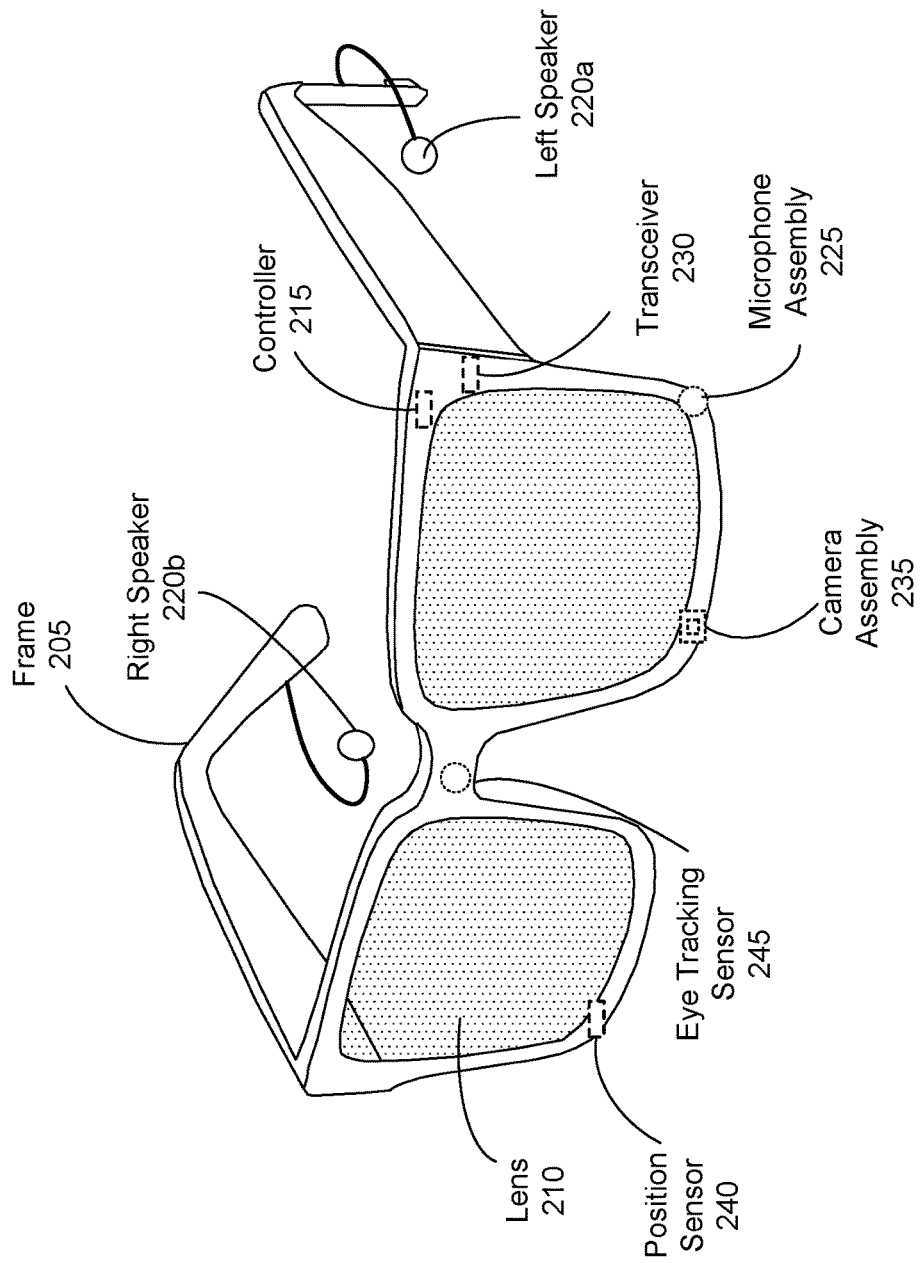
FIG. 2 is an example illustrating a headset including an audio system that may be worn by a user in a shared communication channel, in accordance with one or more embodiments.

FIG. 2 is an example illustrating a headset 110 including an audio system that may be worn by a user in a shared communication channel, according to one or more embodiments. The headset 110 presents media to a user. In one embodiment, the headset 110 may be a near-eye display (NED). In another embodiment, the headset 110 may be a head-mounted display (HMD). In general, the headset may be worn on the face of a user (e.g., a user 105) such that content (e.g., media content) is presented using one or both lens 210 of the headset. However, the headset 110 may also be used such that media content is presented to a user in a different manner. Examples of media content presented by the headset 110 include one or more images, video, audio, or some combination thereof. The headset 110 includes the audio system, and may include, among other components, a frame 205, a lens 210, a camera assembly 235, a position sensor 240, a eye tracking sensor 245, and a controller 215 for controlling the audio system and various other sensors of the headset 110. While FIG. 2 illustrates the components of the headset 110 in example locations on the headset 110, the components may be located elsewhere on the headset 110, on a peripheral device paired with the headset 110, or some combination thereof.

The headset 110 may correct or enhance the vision of a user, protect the eye of a user, or provide images to a user. The headset 110 may be eyeglasses which correct for defects in a user's eyesight. The headset 110 may be sunglasses which protect a user's eye from the sun. The headset 110 may be safety glasses which protect a user's eye from impact. The headset 110 may be a night vision device or infrared goggles to enhance a user's vision at night. The headset 110 may be a near-eye display that produces artificial reality content for the user. Alternatively, the headset 110 may not include a lens 210 and may be a frame 205 with an audio system that provides audio content (e.g., music, radio, podcasts) to a user.

The lens 210 provides or transmits light to a user wearing the headset 110. The lens 210 may be prescription lens (e.g., single vision, bifocal and trifocal, or progressive) to help correct for defects in a user's eyesight. The prescription lens transmits ambient light to the user wearing the headset 110. The transmitted ambient light may be altered by the prescription lens to correct for defects in the user's eyesight. The lens 210 may be a polarized lens or a tinted lens to protect the user's eyes from the sun. The lens 210 may have one or more waveguides as part of a waveguide display in which image light is coupled through an end or edge of the waveguide to the eye of the user. The lens 210 may include an electronic display for providing image light and may also include an optics block for magnifying image light from the electronic display.

In some embodiments, the headset 110 may include a camera assembly 235 that captures visual information for a local area surrounding the headset 110. In some embodiments, the camera assembly 235 corresponds to a depth camera assembly (DCA) that captures data describing depth information for the local area. In some embodiments, the DCA may include a light projector (e.g., structured light and/or flash illumination for time-of-flight), an imaging device, and a controller. The captured data may be images captured by the imaging device of light projected onto the local area by the light projector. In one embodiment, the DCA may include two or more cameras that are oriented to capture portions of the local area in stereo and a controller. The captured data may be images captured by the two or more cameras of the local area in stereo. The controller computes the depth information of the local area using the captured data and depth determination techniques (e.g., structured light, time-of-flight, stereo imaging, etc.). Based on the depth information, the controller 215 may be able to determine absolute positional information of the headset 110 within the local area. The DCA may be integrated with the headset 110 or may be positioned within the local area external to the headset 110. In the latter embodiment, the controller of the DCA may transmit the depth information to the controller 215 of the headset 110.

The position sensor 240 is configured to generate one or more measurement signals and estimate a current position of the headset 110 based upon the generated signals. In some embodiments, the current position of the headset 110 is determined relative to an initial position of the headset 110. The estimated position may include a location of the headset 110 and/or an orientation of the headset 110 or the user's head wearing the headset 110, or some combination thereof. For example, the orientation may correspond to a position of each ear relative to the reference point. In some embodiments where the camera assembly 235 comprises a DCA, the position sensor 240 uses the depth information and/or the absolute positional information from the DCA to estimate the current position of the headset 110. The position sensor 240 may include one or more accelerometers to measure translational motion (forward/back, up/down, left/right) and one or more gyroscopes to measure rotational motion (e.g., pitch, yaw, roll). In some embodiments, the position sensor 240 comprises other types of sensors usable to detect motion, such as one or more magnetometers.

In some embodiments, the position sensor 240 comprises an inertial measurement unit (IMU) that rapidly samples received measurement signals and calculates the estimated position of the headset 110 from the sampled data. For example, the IMU integrates the measurement signals received from the accelerometers over time to estimate a velocity vector and integrates the velocity vector over time to determine an estimated position of a reference point on the headset 110. The reference point is a point that may be used to describe the position of the headset 110. While the reference point may generally be defined as a point in space, however, in practice the reference point is defined as a point within the headset 110. In some embodiments, the IMU may be implemented as a portion of the local controller 215 instead of the position sensor 240.

The eye tracking sensor 245 is configured to provide sensor readings (e.g., captured images of the user's eye) usable for determining a gaze direction of the user. When wearing the headset 110, the user's eyes may move relative to their head, allowing the user to look in different directions without having to move their head. As such, the user may be looking a direction that is different from directly ahead relative to the position and orientation of the headset 110 (e.g., as determined by the position sensor 240).

In some embodiments, the eye tracking sensor 245 comprises an eye tracking sensor configured to determine an orientation of the user's eye. The eye tracking sensor captures and analyze images of an eye of the user to determine an orientation of the user's eye relative to the headset 110. In some embodiments, the eye tracking sensor comprises one or more light sources and one or more cameras. The one or more light sources illuminate the eye with IR light, e.g., an infrared flash (e.g., used for time-of flight depth determination), structured light pattern (e.g., dot pattern, bar pattern, etc.), a glint pattern, etc. A source may be, e.g., a vertical cavity emitting laser, a light emitting diode, a micro-LED, some other source of infrared light IR, or some combination thereof. The one or more cameras are configured to capture images of one or both of the eyes illuminated with the IR light from the one or more sources. The camera includes an image sensor (e.g., complementary metal-oxide semiconductor, charge-coupled device, etc.) that is configured to detect light emitted from the one or more sources. In some embodiments, the camera may also be able to detect light in other bands (e.g., visible band). The eye tracking sensor determines eye orientation for one or both of the user's eyes using the captured images and a depth determination technique. Depth determination techniques may include, e.g., structured light, time-of-flight, stereo imaging, some other depth determination methodology familiar to one skilled in the art, etc. In some embodiments, the eye tracking sensor determines eye orientation based upon the captured images and a model of the user's eye.

The eye orientation determined by the eye tracking sensor may be combined with a determined position of the headset 110 (e.g., as determined using the position sensor 240), to determine the user's gaze direction. For example, a vector corresponding to the eye orientation of the user (which indicates the orientation of the user's eye relative to their head) can be added to a vector corresponding to the position of the headset (indicating the location and orientation of the headset within the local environment) to determine a vector corresponding to the gaze direction of the user (indicating a direction the user is looking at in the local environment). By determining the gaze direction of the user, a direction that the user is looking at in the environment is identified, which can, in combination of knowledge of the positions of other users of the shared communication channel, allow for a determination as to which other users the user is looking towards.

In some embodiments, the eye tracking sensor 245 further receives one or more images from a camera of the camera assembly 235 depicting the local area within a FOV of the camera, and maps the determined eye orientation to a location within the received image. In some embodiments, the module uses an object recognition to identify one or more objects within the one or more images (e.g., other users), and maps the determined eye orientation to one or more identified objects.

The audio system of the headset 110 is configured to allow the user to communicate with other users within a shared communication channel 110. In some embodiments, the audio system comprises a microphone assembly 225, a transceiver 230, a speaker assembly having one or more speakers, and a controller 215. The controller 215 is configured to coordinate operations between the various components of the headset 110. For example, the controller 215 may control the microphone assembly 225 to capture audio data corresponding to the user's speech, to be transmitted to other users within the shared communication channel via the transceiver 230. In addition, the controller 215 may receive, via the transceiver 230, audio data corresponding to other users of the shared communication channel, and process the received audio data (e.g., spatialize and/or reinforce the audio data) based upon a relative position of the other user to the current position of the user (e.g., as determined by the position sensor 240). The processed audio data can be played back to the user using the speaker assembly. Additional details regarding the audio system is discussed with regards to FIG. 3.

The microphone assembly 225 records sounds within a local area of the headset 110. A local area is an environment surrounding the headset 110. For example, the local area may be a room that a user wearing the headset 110 is inside, or the user wearing the headset 110 may be outside and the local area is an outside area in which the microphone assembly is able to detect sounds. The microphone assembly 225 includes one or more acoustic sensors. In some embodiments, the acoustic sensors are configured to record speech by the user of the headset 110. To do so, the acoustic sensors may be located near the mouth of the user, and may have a short capture range in order to avoid capturing other sounds not originating from the user. In some embodiments, the acoustic sensors may be located on a separate mouthpiece or other structure, in order to be located closer to the user's mouth.

In some embodiments, the acoustic sensor comprises a port corresponding to an aperture in the frame 205 of the headset 110. The port provides an incoupling point for sound from a local area to an acoustic waveguide that guides the sounds to an acoustic sensor. An acoustic sensor captures sounds emitted from one or more sound sources in the local area, and is configured to detect sound and convert the detected sound into an electronic format (analog or digital). The acoustic sensor may be an acoustic wave sensor, a microphone, a sound transducer, or similar sensor suitable for detecting sounds.

Although FIG. 2 illustrates the microphone assembly 225 as being positioned at a single location on the headset 110, in some embodiments the microphone assembly 225 comprises a microphone array having a plurality of acoustic detection locations that are positioned on the headset 110. Each acoustic detection location may include an acoustic sensor or a port. The acoustic detection locations may be placed on an exterior surface of the headset 110, placed on an interior surface of the headset 110, separate from the headset 110 (e.g., part of some other device), or some combination thereof.

The transceiver 230 is configured to communicate with transceivers of other headsets of other users. For example, the transceiver 230 may transmit data (e.g., an audio corresponding to speech by the user) to the headsets of other users within the shared communication channel, and receive data (e.g., audio signals corresponding to speech by the other users) from the headsets of the other users. In some embodiments, the transceiver 230 may access a network (e.g., the network 125) to communicate with an application server or console (e.g., an application server configured to maintain the shared communication channel). The transceiver 230 may comprise a transmitter, a receiver, or both.

The headset 110 further comprises a speaker assembly configured to play back one or more audio signals as sounds projected to the user of the headset 110. In some embodiments, the speaker assembly includes two or more speakers, allowing for the sound projected to the user to be spatialized (e.g., by adjusting an amplitude of the sound projected through each of the speakers 220), such that the sound can sound to the user as originating from a particular location or direction in the local area. For example, as illustrated in FIG. 2, the speakers assembly may comprise a left speaker 220a and a right speaker 220b corresponding to the user's left and right ears. In some embodiments, the speakers may cover the ears of the user (e.g., headphones) or be inserted into the ears of the user (e.g., earbuds).

Although FIG. 2 illustrates two speakers (e.g., left and right speakers 220a and 200b), in some embodiments, the speakers may comprise a loudspeaker array comprising a plurality of acoustic emission locations on the headset 110. An acoustic emission location is a location of a speaker or a port in the frame 105 of the headset 110. In the case of an acoustic emission location, the port provides an outcoupling point of sound from an acoustic waveguide that separates a speaker of the loudspeaker array from the port. Sound emitted from the speaker travels through the acoustic waveguide and is then emitted by the port into the local area. In some embodiments, the acoustic emission locations are placed on an exterior surface (i.e., a surface that does not face the user) of the frame 205, on an interior surface (a surface that faces the user) of the frame 205, or some combination thereof.

Although FIG. 2 illustrates the various components of the headset 110 in a particular arrangement, it is understood that in other embodiments, the headset 110 may contain different components that those described here, and that the components of the headset 110 may have different structures or be arranged differently. In some embodiments, some of the functions discussed above may be performed by different components or combinations of components.

In the illustrated configuration the audio system is embedded into a NED worn by a user. In alternate embodiments, the audio system may be embedded into a head-mounted display (HMD) worn by a user. Although the description above discusses the audio assemblies as embedded into headsets worn by a user, it would be obvious to a person skilled in the art, that the audio assemblies could be embedded into different headsets which could be worn by users elsewhere or operated by users without being worn.

Audio System

Figure 3:
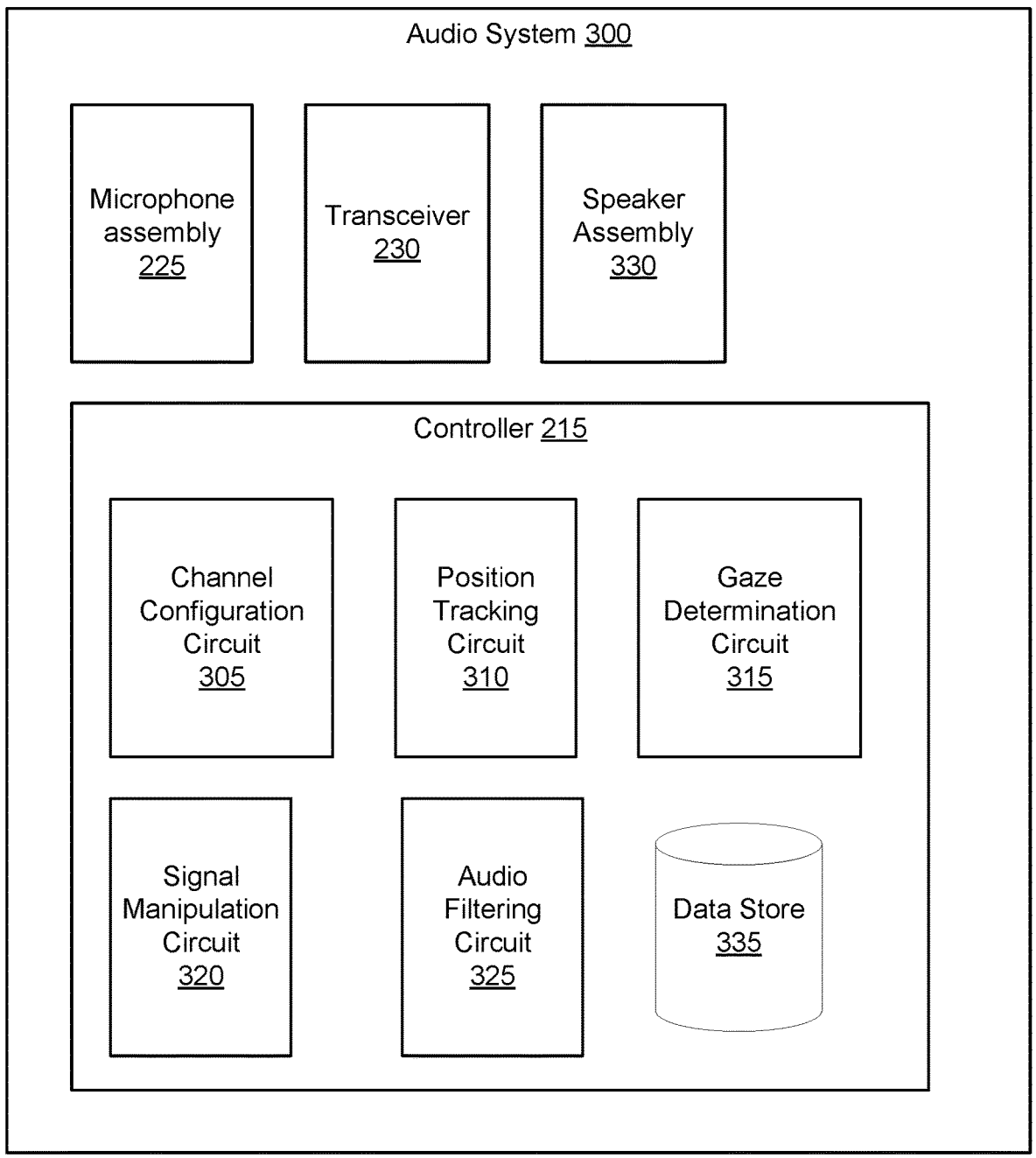
FIG. 3 illustrates a block diagram of an audio system, in accordance with one or more embodiments.

FIG. 3 illustrates a block diagram of an audio system 300, in accordance with one or more embodiments. The audio system 300 may be implemented as part of a headset (e.g., the headset 110), and may comprise a microphone assembly 225, a transceiver 230, a speaker assembly 330, and a controller 215. Some embodiments of the audio system 300 have different components than those described here. Similarly, the functions can be distributed among the components in a different manner than is described here. In some embodiments, some of the functions of the audio system may be part of different components (e.g., some may be part of the headset and some maybe part of a console and/or server).

The microphone assembly 225 is configured to capture sound within a local area of the user and to generate an audio signal corresponding to the captured sound. In some embodiments, the microphone assembly 225 is configured to capture speech by the user, and comprises a plurality of microphones configured to beam form towards a particular portion of the local area (e.g., near the user's mouth) to increase detection of sounds spoken by a user of the headset. For example, each microphone generates an audio input signal corresponding to the sound detected by the microphone. By analyzing the audio input signal for each microphone, sounds originating from a particular region in the local area of the user (e.g., near the user's mouth) can be identified. The controller 215 generates a user audio signal from the audio input signal by reinforcing the portion of the audio input signal corresponding to the sounds originating from the particular region. As such the user audio signal can be generated such that it reflects sounds originating at or near the mouth of the user (e.g., corresponding to the user's speech). This may be useful as it allows for a clear audio signal of the user's speech to be captured, even in environments with large amounts of sound from other sources (e.g., in a crowded room).

The transceiver 230 is configured to transmit and receive data to and from other users within a shared communication channel that the user is a part of. For example, the transceiver 230 may receive audio data captured by the microphone assembly 225 (e.g., corresponding to the user's own speech), and transmit the received audio data to the transceivers on the headsets of other users within the shared communication channel. In addition, the transceiver 230 receives audio data output by other users of the shared communication channel (referred to as an audio output signal or audio signal), which may be processed (e.g., by the local controller 215) and played to the first user (e.g., via the speakers 220). The transceiver 230 communicates and receives information via electromagnetic waves. The electromagnetic waves may be, e.g., radio frequency (RF), IR, or some combination thereof. In some embodiments, the transceiver 230 uses RF and/or infrared communication to communicate with transceivers of other users in the local area. In some embodiments, a plurality of transceivers corresponding to headsets of a plurality of users may communicate with each other to establish a local network (e.g., via BLUETOOTH or other type of protocol). In some embodiments, the transceiver 230 may also communicate wirelessly (e.g., via Wi-Fi) with an application server over a network (e.g., the internet) or with a local console configured to maintain the shared communication channel. In addition, in embodiments where the shared communication channel can include remote users, the transceiver 230 may communicate with the remote user through the application server or local console.

In some embodiments, the data transmitted and received by the transceiver 230 comprise metadata corresponding to transmitted/received audio data. The metadata may indicate an identity of the user associated with the audio data (e.g., a user ID) and information from which a position of the user may be derived. For example, the metadata may include current position information of the user (e.g., as determined by a position sensor on the headset of the user). In some embodiments, the transceiver 230 of a first headset 110 comprises an antenna array, each antenna located at different locations on the first headset 110, such that a relative timing or phase of the signals received by each antenna from the transceiver of a second headset may be used to determine a relative position of the second headset.

The speaker assembly 330 is configured to play back one or more audio signals as sounds projected to the user of the headset. As discussed above, in some embodiments, the speaker assembly 330 includes two or more speakers, allowing for the sound projected to the user to be spatialized (e.g., by adjusting an amplitude of the sound projected through each of the speakers), such that the sound can sound to the user as originating from a particular location or direction in the local area.

A speaker may be, e.g., a moving coil transducer, a piezoelectric transducer, some other device that generates an acoustic pressure wave using an electric signal, or some combination thereof. In some embodiments, the speaker assembly 330 also includes speakers that cover each ear (e.g., headphones, earbuds, etc.). In other embodiments, the speaker assembly 330 does not include any speakers that occlude the ears of a user (e.g., the speakers are on a frame of a headset).

The controller 215 comprises circuits modules for operating the microphone assembly 225, transceiver 230, and speaker assembly 330. These may include a data store 335, a channel configuration circuit 305, a position tracking circuit 310, a gaze determination circuit 315, a signal manipulation circuit 320, and an audio filtering circuit 325. Although FIG. 3 illustrates the components as the controller 215 as corresponding to different circuits, it is understood in other embodiments, the channel configuration circuit 305, the position tracking circuit 310, the gaze determination circuit 315, the signal manipulation circuit 320, and the audio filtering circuit 325 may be embodied in software (e.g., software modules), firmware, hardware, or any combinations thereof.

The data store 335 stores data used by the various other modules of the controller 215. The stored data may include one or more parameters of a shared communication channel (e.g., identities of other users in a shared communication channel, authentication information for accessing the shared communication channel, etc.). The stored data may include position information associated with the user (e.g., location and pose of the user, as determined by the position sensor 240) and/or position information associated with the audio systems of other users (e.g., received from the headsets of other users). In some embodiments, the data store 335 may store one or more models of the local area. For example, the controller 215 may generate a model of the local area indicating the positions of the user and other users in the local environment, one or more objects in the local environment (e.g., detecting using the camera assembly 235), etc. The data store 335 may also store one or more eye tracking parameters (e.g., light patterns to be used for eye tracking, model of the user's eye, etc.), audio content (e.g., recorded audio data, received audio data, etc.), one or more parameters for spatializing audio content (e.g., head-related transfer functions), one or more parameters for reinforcing audio content (e.g., algorithms for determining attention scores), one or more parameters for filtering audio content, some other information used by the audio system 300, or some combination thereof.

The channel configuration circuit 305 is configured to maintain the user's membership in a shared communication channel. As used herein, maintaining the user's membership in the shared communication channel may include, e.g., establishing the shared communication channel, adding and/or removing the user as a member to an existing shared communication channel, updating one or more parameters of the shared communication channel (e.g., via communication with an application server or with audio systems of other users in the shared communication channel), perform other action associated with the shared communication channel, or some combination thereof.

In some embodiments, a user may establish a shared communication channel by providing to the channel configuration circuit 305 (e.g., via a user interface, via a scanning device, etc.) information corresponding to one or more additional users. In response, the channel configuration circuit 305 may establish the shared communication channel to include the users and the one or more additional users. In some embodiments, the channel configuration circuit 305 transmits data to channel configuration circuits associated with each of the additional users (e.g., via the transceiver 230) to establish the shared communication channel.

In some embodiments, the channel configuration circuit associated with each user in the shared communication channel stores information corresponding to the channel in a respective data store (e.g., data store 335). The information may comprise identities of other users within the shared communication channel, authentication information needed to communicate over the shared communication channel, etc. In some embodiments, the channel configuration circuit 305 may detect a change in one or more channel parameters, such as a change in user membership of the channel (e.g., a new user joining the channel, a user exiting the channel, a change in priority level of a user), a change in authentication information associated with the channel, a change in other parameters of the channel, or some combination thereof. In response to detecting the change in channel parameters, the channel configuration circuit 305 may communicate the change to the channel configuration circuits of other users in the channel. As such, the channel communication circuits of the users may coordinate with each other such that each channel communication circuit is able to access up-to-date parameters concerning the shared communication channel, so that each audio system 300 is able to communicate with those of other users of the channel.

In other embodiments, the channel configuration circuit 305 communicates (via the transceiver 230) with an application server, which coordinates the establishment of the shared communication channel (e.g., by communicating with the channel configuration circuits of the audio systems of each user to be included in the shared communication channel). For example, channel configuration circuit 305 communicates with the application server to indicate participation in the shared communication channel and to receive parameters associated with the shared communication channel (e.g., identities of other users within the shared communication channel, any authentication information needed to communicate over the shared communication channel, etc.). In addition, the channel communication circuit 305 may communicate with the application server to indicate any changes relating to the user's participation in the channel. The application server may be responsible for maintaining the parameters for the shared communication channel, and communicates the parameters to the channel communication circuits corresponding to the users participating in the channel, to ensure that channel communication circuit have access to up-to-date parameters of the channel.

The position tracking circuit 310 is configured to determine a current position of the user. The position tracking circuit 310 receives position information corresponding to the headset of the user from a position sensor (e.g., the position sensor 240), and determines a current position of the headset based upon the received position information. The position of the user's headset may indicate a location of the user within a local environment, as well as an orientation of the user (e.g., an orientation of the headset on the user's head, hereinafter also referred to as a "head orientation" of the user). In some embodiments, the position of the user is calculated relative to a reference point. In some embodiments, one or more functions of the position tracking circuit 310 are performed by an IMU.

The position tracking circuit 310 may be further configured to determine position information corresponding to other users of the shared communication channel. In some embodiments, position information corresponding to other users may be received (e.g., via the transceiver 230) directly from headsets of the other users. For example, the position information may be received as metadata accompanying audio data received from one or more other users of the shared communication channel, the position information indicating a current position of the user from which the audio data was received (e.g., as determined by the position tracking module of the other user's headset). In some embodiments, the position tracking circuit 310 uses the obtained position information of the other users to determine a relative position of each of the other users to the current position of the user. In some embodiments, the position tracking circuit 310 may use the determined positions of the other users to generate or update a model of the local area.

In other embodiments, the position tracking circuit 310 determines the position of the other user based upon analyzing signals received from a plurality of antennas of an antenna array on the headset of the other user. For example, in some embodiments, the transceiver 230 of the audio system 300 of a first headset comprises an antenna array, each antenna located at different locations on the first headset. The position tracking circuit 310 of the first headset analyzes the signals from the transceiver of a second headset received at each antenna of the array, and determines a relative position of the second headset based upon a relative timing or phase of the received signals. In other embodiments, the transceiver 230 receives a plurality of different signals transmitted by a transceiver of a second headset, where the transceiver of the second headset is an antenna array comprising a plurality of antennas at different locations on the second headset. The position tracking circuit 310 analyzes the received signals (e.g., a timing or phase of the received signals), from which it can determine a relative position of the second headset to the first headset.

The gaze determination circuit 315 is configured to determine a gaze direction of the user wearing the headset (e.g., based upon eye tracking measurements by the eye tracking sensor 245, such as captured images of the user's eye). As used herein, the gaze direction of a user corresponds to a direction that the user is looking at in the local environment. In some embodiments, the gaze direction of the user is determined based upon a combination of a head orientation of the user and the eye position of the user. For example, the gaze determination circuit 315 may receive one or more eye tracking measurements from the eye tracking sensor 245 (e.g., one or more images of the user's eye captured by an eye tracking camera) to determine the current eye orientation of the user, and a head orientation of the user (e.g., as determined by the position tracking circuit 310), and modify the head orientation of the user with the determined eye orientation to determine a gaze direction of the user within the local environment. For example, a user's head may be facing in a first direction. However, if the user's eyes are oriented to be looking away from the first direction (e.g., not looking straight ahead), then the gaze direction of the user will be different from the head orientation of the user.

In some embodiments, the gaze determination circuit 315 may also receive one or more images of the local area from the camera assembly 235 within a FOV of the camera, and maps the determined eye orientation to a location within the received image. The gaze determination circuit may use object recognition to identify one or more objects within the one or more images (e.g., other users) corresponding to the mapped locations, to determine whether the user's gaze direction aligns with one or more identified objects. In some embodiments, the identified objects may be used to generate or update a model of the local area. For example, the locations of the identified objects, such as other users, within the one or more images may be used to determine whether the user is looking at any of the identified objects, where the identified objects are located relative to the user, whether the user has line-of-sight to the identified objects, etc.

Although FIG. 3 illustrates the position tracking circuit 310 and the gaze determination circuit 315 as being separate modules, in some embodiments, the position tracking circuit 310 and the gaze determination circuit 315 may be implemented as a single module. For example, the single gaze determination circuit may receive sensor measurements (e.g., position data from the position sensor 240 and eye tracking data the eye tracking sensor 245) to determine the position of the user, the head orientation of the user, and the orientation of the user's eyes relative to their head, from which the gaze direction of the user can be determined.

The signal manipulation circuit 320 is configured receive one or more audio signals received via the transceiver 230, each corresponding to an audio system of another user (referred to as "sending audio systems") of the shared communication channel, and manipulate the signal to generate audio data to be presented the user, based upon relative positions of the other audio systems to the user.

The signal manipulation circuit 320 identifies a relative position of the sending user to the current position of the user. The position information may be received from the position determination module 310. In some embodiments, the signal manipulation circuit 320 accesses a model of the local area containing position information for each user in the local area to determine the relative position of the sending user. In addition, the signal manipulation circuit 320 may receive an indication of a current gaze direction of the user from the gaze determination circuit 315. Based upon the relative positions of the users, the signal manipulation circuit 320 can spatialize the audio signal from a sending user such that when it is played to the user (e.g., via the speakers 220), the sound will appear to originate from the location of the sending user.

In some embodiments, the signal manipulation circuit 320 spatializes the audio signal based upon one or more generated acoustic transfer functions associated with the audio system. The acoustic transfer functions may be head-related transfer functions (HRTFs) or other types of acoustic transfer functions. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. For example, in some embodiments, the signal manipulation circuit 320 may generate two sets of HRTFs for the user, one for each ear, the correspond to various frequencies and relative positions. An HRTF or a pair of HRTFs can be used to create audio content that includes sounds that seem to originate from a specific point in space (e.g., from a location of a sending audio system). Several HRTFs may be used to create surround sound audio content (e.g., for home entertainment systems, theater speaker systems, an immersive environment, etc.), where each HRTF or each pair of HRTFs corresponds to a different point in space such that audio content seems to come from several different points in space. Additional examples of generating HRTFs are described in U.S. patent application Ser. No. 16/015,879, titled "Audio System for Dynamic Determination of Personalized Acoustic Transfer Functions," which is hereby incorporated by reference in its entirety.

In some embodiments, the signal manipulation circuit 320 may reinforce the audio signal based upon a position of the sending user relative to a reinforcement direction. As used herein, the reinforcement direction of the user may refer to a direction that the user is inferred as paying attention to. In some embodiments, the reinforcement direction of the user may correspond to the gaze direction of the user. In other embodiments, the reinforcement direction may be based upon an orientation of the user's head, an orientation of the user's head relative to their torso, and/or the like. For ease of discussion, the reinforcement direction will be primarily discussed as corresponding to the gaze direction, although it is understood that the reinforcement direction may correspond to other directions relative to the user in other embodiments.

As used herein, reinforcing an audio signal may refer to either positively reinforcing the audio signal (e.g., increasing the amplitude of the audio signal relative to other sounds or audio signals) or negatively reinforcing the audio signal (e.g., decreasing the amplitude of the audio signal relative to other sounds or audio signals). For example, in some embodiments, audio signals from sending users that the user is looking at (e.g., implying that the user is paying attention to the sending user), as determined based upon the gaze direction of the user, are positively reinforced, while audio signals from other sending users that the user is not looking at are negatively reinforced. This may allow the user to more easily focus on speech from certain users (e.g., sending users they are paying attention to), with less distraction from speech from other users, especially in cases where a large number of users are speaking at the same time. In some embodiments, the signal manipulation circuit 320 reinforces each received audio signal based upon an "attention score" calculated for each sending user, which is described in greater detail below with regards to FIG. 4.

The signal manipulation circuit 320 may spatialize the received audio data based upon the head orientation of the user, due to the user's ears being at fixed positions on the user's head. On the other hand, the signal manipulation circuit 320 reinforces the audio data based upon the gaze direction of the user, to better emphasis audio data originating from other users that the user is actually looking at or is paying attention to.

Although the above discussion primarily refers to reinforcing audio data based upon the gaze direction of the user, in other embodiments, reinforcement of audio data may be based upon other directions, such as a head direction of the user, a head direction of the user modified by an angle of the user's head relative to their torso, or some combination thereof.

The signal manipulation circuit 320 further outputs the spatialized and reinforced audio signal to the speakers of the speaker assembly 330. For example, the signal manipulation circuit 320 may output audio signals of different amplitudes to each of the speakers of the speaker assembly 320, based upon the spatialization and/or reinforcement performed.

The audio filtering circuit 325 is configured receive a user audio signal corresponding to speech by the user (e.g., as captured by the microphone assembly 225), and to perform filtering on the user audio signal. The user audio signal may be transmitted to other users in the shared communication channel. In addition, in some embodiments, the user audio signal can also be played back to the user through the speaker assembly 330.

In some embodiments, because the users of the shared communication channel may be in proximity to each other, a user may be able to hear the actual sounds of the speech of a sending user, as well as receive audio data through their headset corresponding to the sending user's speech. Due to time required to process the received audio signal, the audio data may be presented to the user (e.g., through speaker assembly 330) after the speech of the sending user can be heard at the location of the user. The delay between when the actual speech of the sending user can be heard at the location of the user, and when the audio data of the sending user to played to the user through the speaker assembly 330 is referred to as a processing delay. If the processing delay exceeds a certain amount of time, the audio data presented to the first user may sound like an echo to the first user. This produces an undesirable audio effect may be distracting for the user. For example, in some embodiments, an echo effect is created when the processing delay is greater than 10 to 15 ms.

In some embodiments, the audio filtering circuit 325 comprises an all-pass filter that manipulates a phase of the user audio signal to produce a temporally dispersed user audio signal (hereinafter referred to as a "diffused user audio signal"). The diffused user audio signal may comprise a plurality of diffuse reflections of the user audio signal having a same total energy as the original unfiltered signal. For sounds corresponding to speech, diffusing the user audio signal allows for it to less detectable to the human ear as a separate auditory event in comparison to the unfiltered signal. This allows for the user audio signal to undergo a longer processing delay before it will be detected by the other users receiving the user audio signal as a separate echo. Examples of diffusing the user audio signal are described in greater detail with regards to FIG. 5 below. Although the present discussion refers to the audio filtering circuit 325 performing temporal dispersion on the user audio signal in preparation for transmitting the user audio signal to other users within a shared communication channel, in some embodiments, the audio filtering circuit 325, instead of performing temporal dispersion on the user audio signal, performs temporal dispersion on audio signals received from the audio systems of other users prior to playing back to the user. In some embodiments, other filtering techniques may be used. For example, the audio filtering circuit 325 may in some embodiments modify a frequency magnitude spectrum of the user audio signal instead of or in addition to temporally diffusing the user audio signal.

In some embodiments, the audio filtering circuit 325 further filters the user audio signal to generate a modified user audio signal to be played back to the user of the audio system 300. When a user is speaking in a noisy environment and/or speaking into a microphone, oftentimes the user may not be aware of the volume of their own voice due to not being to the sound of their own voice been drowned out in the noisy environment. As such, the user may inadvertently raise their voice more than necessary.

To prevent the user from attempting to shout over the noise of the environment, a version of the user audio signal may be played back to the user, so that the user can more accurately access the volume of their voice. Because a person hears their own voice differently from how their voice sounds as captured by a microphone (e.g., due to vibrations in their skull caused by their vocal chords reaching their ear in addition to sound waves through the air), the user audio signal may be modified in order for the user to recognize the sound of the user audio signal as their own voice. In some embodiments, the user audio signal is passed through one or more filters that approximate the effects of skull vibration on the voice of the user as perceived by the user. In some embodiments, the one or more filters are configured to be generally applicable to most people (e.g., based on an average skull shape and size). In other embodiments, the one or more filters may be customized based upon one or more user settings. For example, the user of the headset 110 may, during a setup period, configure one or more settings of the filters to more closely approximate how they hear their voice. In some embodiments, the filters may comprise a low pass filter, wherein the user is able to adjust a slope and a cutoff frequency of the filter. In some embodiments, the filters may comprise a series of one or more adjustable biquad filters, an FIR (finite impulse response) filter, or some combination thereof.

As such, by feeding back a filtered version of the user audio signal back to the user, the user can more accurately assess the volume of their voice, even in noisy environments, and can avoid raising their voice unnecessarily. In some embodiments, the filtered version of the user audio signal is only played back to the user if an amount of noise in the environment (e.g., measured using the microphone assembly) exceeds a threshold value, such that the filtered user audio signal is not played back to the user if the amount of noise in the environment is such that the user could be expected to be able to hear their own voice.

Position-Based Audio Spatialization and Reinforcement

Figure 4:
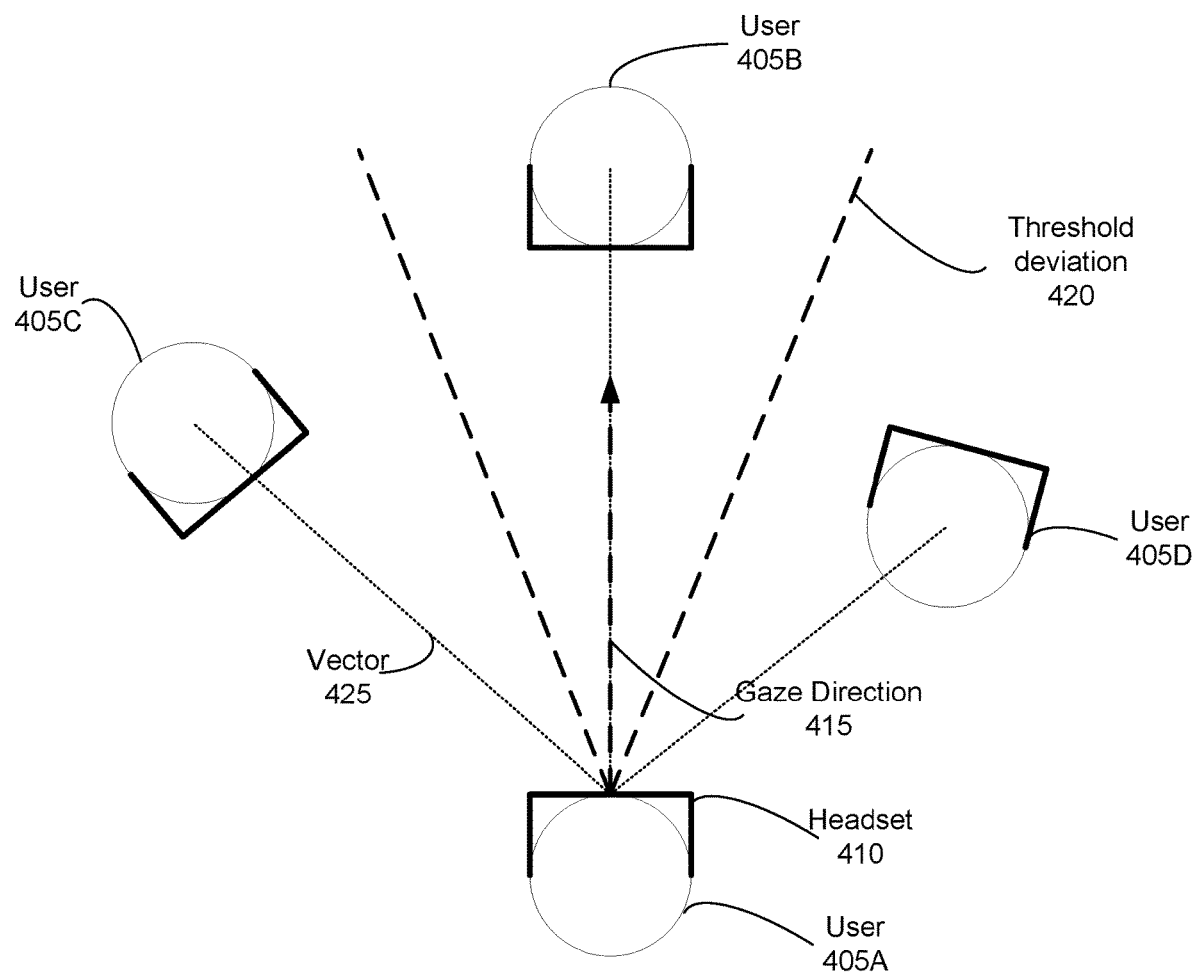
FIG. 4 illustrates an example of an environment having a plurality of users with a shared communication channel, in accordance with one or more embodiments.

FIG. 4 illustrates an example of an environment having a plurality of users with a shared communication channel, in accordance with one or more embodiments. The environment contains a plurality of users, including a first user 405A and additional users 405B, 405C, and 405D (collectively referred to as user 405), that are part of a shared communication channel. Each user 405 is wearing a respective headset 410 containing an audio system used by the user to communicate with other users of the shared communication channel. For ease of explanation, only the headset 410 worn by the first user 405A is labelled in FIG. 4.

The headset 410 of the first user 405A comprises a position sensor and eye tracking sensor configured to determine a position and a gaze direction of the first user 405A, which may be used to determine a reinforcement direction 415 for the first user 405A. While FIG. 4 illustrates that the reinforcement direction 415 of the first user 405A as being aligned with the orientation of the headset 410 and the user's 405A head, the reinforcement direction 415 may not align with the orientation of the user's 405A head. For example, in some embodiments, the reinforcement direction 415 may correspond to the gaze direction of the user 405A. As such, as the user 405A moves their eyes, the reinforcement direction 415 may change even if the position of the user 405A and the orientation of the user's 405A head stays static. In other embodiments, the reinforcement direction of the user 405A may correspond to a head direction of the user (e.g., based on an orientation of the user's head), the head direction of the user modified by an angle between the user's head and torso orientations (e.g., the reinforcement direction 415 deviating from the head direction of the user as the angle between the user's head and torso increases), or some combination thereof.

Each of the other users 405B, 405C, and 405D within the environment may be a sending user. In response to speech by each of the users 405B, 405C, or 405D, audio data is recorded (e.g., by their respective headsets) and transmitted to the headset 410 of the first user 405A (as well as other users participating in the channel). The signal manipulation circuit 320 of the headset 410 analyzes the relative positions of each of the other users to determine how the audio signal for each user should be manipulated.

In some embodiments, the audio system of the headset 410 of the first user 405A determines position information corresponding to each of the sending users that transmit audio signals to the user 405A, and determines, for each of the sending users, a relative position of the sending user relative to the head orientation of first user 405A, and a deviation between the position of the sending user relative to the reinforcement direction 415 of the first user 405A.

The relative position of the sending user relative to the head orientation of the first user 405A is used by the audio system to spatialize the audio signal received from the sending user. Using the determined relative position and a determined current head orientation of the user 405A, the audio system spatializes the audio signal such that when projected to the user 405A via the speaker assembly of the headset 410, the sound of the audio signal appears to originate from the location of the corresponding sending user. In some embodiments, the audio system spatializes the audio signal by setting one or more weights corresponding to each speaker of the speaker assembly. In some embodiments, the audio system uses an HRTF to spatialize the audio signal. By adjusting an amplitude of the audio signal projected to the user 405A through each of the speakers of the speaker assembly, the resulting sound can be made to appear as if originating from different locations (e.g., corresponding to the locations of the sending users).

For example, as illustrated in FIG. 4, the user 405B is located directed in front of the user. As such, the audio signal from the user 405B is spatialized such that the resulting sound is perceived by the user 405A as originating in front of the user 405A. On the other hand, the user 405C and the user 405D are located respectively to the left and right of the user 405A. As such, the audio system spatializes the respective audio signals such that audio corresponding to the users 405C and 405D appears to originate from the respective locations of the users 405C and 405D.

In some embodiments, spatialization is not performed for audio signals received by the user 405A from sending users that are remote users. In other embodiments, spatialization may be performed for audio signals received from certain types of remote users (e.g., remote users associated with a location within a threshold distance from the user 405A).

In addition, in some embodiments, spatialization is not performed if there is no line of sight between the user 405A and the sending user. For example, the audio system may, in some embodiments, be aware of certain types of objects, such as walls, within the local area (e.g., determined using the camera assembly 235 or other type of sensor). If the vector 425 between the user 405A and a sending user intersects such an object, indicating lack of line of sight between the user 405A and the sending user, the audio signal from the sending user may not be spatialized. In some embodiments, audio signals from sending users with which there is no line of sight may be spatialized if the distance between the user 405A and the sending user is less than a threshold amount, but not if the distance is more than the threshold amount. The threshold amount may be a predetermined amount, or may be determined dynamically based upon one or more user inputs, one or more determined attributes of the local area (e.g., a size of the room), or some combination thereof.

In addition, the audio system reinforces each received audio signal, based upon a deviation of the location of each respective sending user from the reinforcement direction 415 of the user 405A. As used herein, the deviation of the location of a sending user (e.g., user 405C) from the reinforcement direction of the user 405A may be determined based upon an angle measured between the user's 405A reinforcement direction 415 and a vector 425 connecting the users 405A and 405C. In some embodiments, the audio system may also reinforce each received audio signal based upon a distance of the location of each respective sending user from the user 405A (e.g., audio signals from sending users closer to the user 405A are reinforced more strongly in comparison to audio signals from sending users who are further away).

In cases where multiple audio signals from multiple other users are received and projected to the user 405A, it may be difficult for the user 405A to focus on the speech of any one user, even if the audio signals are spatialized. By selectively reinforcing the received audio signals, the user 405A can more easily focus on speech from other users that they are paying attention to, while being less distracted by speech from users that they are not paying attention to.

In some embodiments, which sending user the user 405A is paying attention to can be inferred based upon the reinforcement direction 415 of the user 405A. For example, if the reinforcement direction 415 of the user 405A aligns with the location of another user, the user 405A may be inferred as paying attention to the user. For example, as illustrated in FIG. 4, the user 405A may be inferred as paying attention to the user 405B. In some embodiments, the user 405A may be inferred as paying attention to another user if the location of the other user is within a threshold deviation 420 from the reinforcement direction 415. For example, as illustrated in FIG. 4, the user 405A may be inferred to not be paying attention to the users 405C and 405D, due to the users 405C and 405D being more than the threshold deviation away from the reinforcement direction 415. In some embodiments, if there are multiple sending users within the threshold deviation 420 from the reinforcement direction 415, the user 405A may be considered to be paying attention to the sending user at a location that is closest to the user 405A, to the sending user at a location with the smallest deviation from the reinforcement direction 415, or some combination thereof.

In some embodiments, an "attention score" can be calculated for each of the other users of the shared communication channel. The attention score may function as a metric indicating how much a user can be inferred as paying attention to another user, in order to determine to what extent to reinforce an audio signal received from the other user. The attention score for a particular user may be based upon a deviation of the user's location from the first user's 405A reinforcement direction 415, a distance of the user's location to the location of the first user 405A, or some combination thereof. In some embodiments, the attention score is determined as an aggregation (e.g., a weighted sum) of one or more factors.

The audio system reinforces the audio signal received from a sending user based upon whether the user 405A is paying attention to the sending user (e.g., based upon the attention score of the sending user). For example, the audio system positively reinforces the audio signal if the user 405A is inferred as paying attention to the sending user, and does not positively reinforce the audio signal if the user 405A is inferred as not paying attention to the sending user. In addition, in some embodiments, the audio signal may be negatively reinforced if the user 405A is inferred as not paying attention to the sending user, in order to minimize distraction from the audio signal originating from sending users that the user 405A is paying attention to. In some embodiments, the audio signal of a sending user may be reinforced based upon whether there exists another sending user that the user 405A is determined to be paying attention to (e.g., the audio signal from the user 405C is negatively reinforced if the user 405A is inferred to be paying attention to the user 405B, but is not negatively reinforced if there are no users within the threshold deviation 420 of the reinforcement direction 415).

In some embodiments, the audio system reinforces received audio signals based upon the respective sending user's attention score. In some embodiments, the amount of reinforcement may further be based upon the attention scores of other users (e.g., the ranking of the sending user's score with respect to other sending users). For example, in the example illustrated in FIG. 4, the audio system of the headset 410 may determine how much to reinforce the audio signals from the sending users 405B and 405C by comparing the deviations of the locations of each sending user to the reinforcement direction 415 of the user 405A, and reinforce each audio signal based upon a result of the comparison. For example, in some embodiments, an audio signal from a first sending user may be reinforced less if there is a second sending user with a higher attention score (e.g., due to having a lower deviation from the gaze direction of the user), in comparison to if the second sending user was not present (e.g., not currently sending an audio signal) or had a lower attention score compared to the first sending user.

Because the attention score for a sending user is based upon the reinforcement direction 415 of user 405A, as the user's 405A reinforcement direction 415 changes (e.g., due to movement of their head or eyes), the attention scores for each of the sending users may be adjusted accordingly, resulting in different amounts of reinforcement for their respective audio signals. In some embodiments, the attention score for each sending user is updated periodically. In some embodiments, the attention score for a sending user is updated if the audio system detects a change in the user's 405A reinforcement direction 415 that exceeds a threshold amount.

In embodiments where the reinforcement direction 415 corresponds to the user's gaze direction, because the user's 405A eyes can potentially move very rapidly, the reinforcement direction 415 can potentially change very quickly. In some embodiments, the reinforcement direction 415 is not updated unless the user's 405A gaze has not changed by more than a threshold amount for at least a threshold period of time, in order to reduce the impact of random eye movements by the user 405A.

In some embodiments, the attention score for a sending user may further be based upon a reinforcement direction of the sending user. For example, if the sending user's reinforcement direction is facing the user 405A, then the audio signal corresponding to the sending user may be modified by the signal manipulation circuit 320 to be stronger in comparison to if the sending user's gaze direction is not towards the user 405A. For example, as illustrated in FIG. 4, the audio signal from the user 405C may be reinforced more in comparison to the audio signal from the user 405D, even though both users have a similar magnitude of deviation from the reinforcement direction 415 of the user 405A. In some embodiments, the weight of the sending user's orientation or gaze direction on the sending user's attention score may vary based upon the deviation of the sending user's location from the reinforcement direction 415.

In some embodiments, where the shared communication channel has one or more remote users, the signal manipulation circuit 320 may reinforce audio signals from the remote users based upon whether the user 405A is currently paying attention to another user in the local area. In some embodiments, the user 405A may indicate via a user interface one or more modification to how audio signals from particular sending users are reinforced.

By processing (e.g., spatializing and/or reinforcing) received audio signals based upon the relative positions of the respective sending users, the signal manipulation circuit 320 thus makes it easier for the user 405A to hear and focus on audio from other users that the user is paying attention to (e.g., by positively reinforcing the audio signals from those users), as well as allowing the user 405A to have a better sense of where the other users from which audio signals are received are located.

Audio Filtering for Echo Reduction

Figure 5:
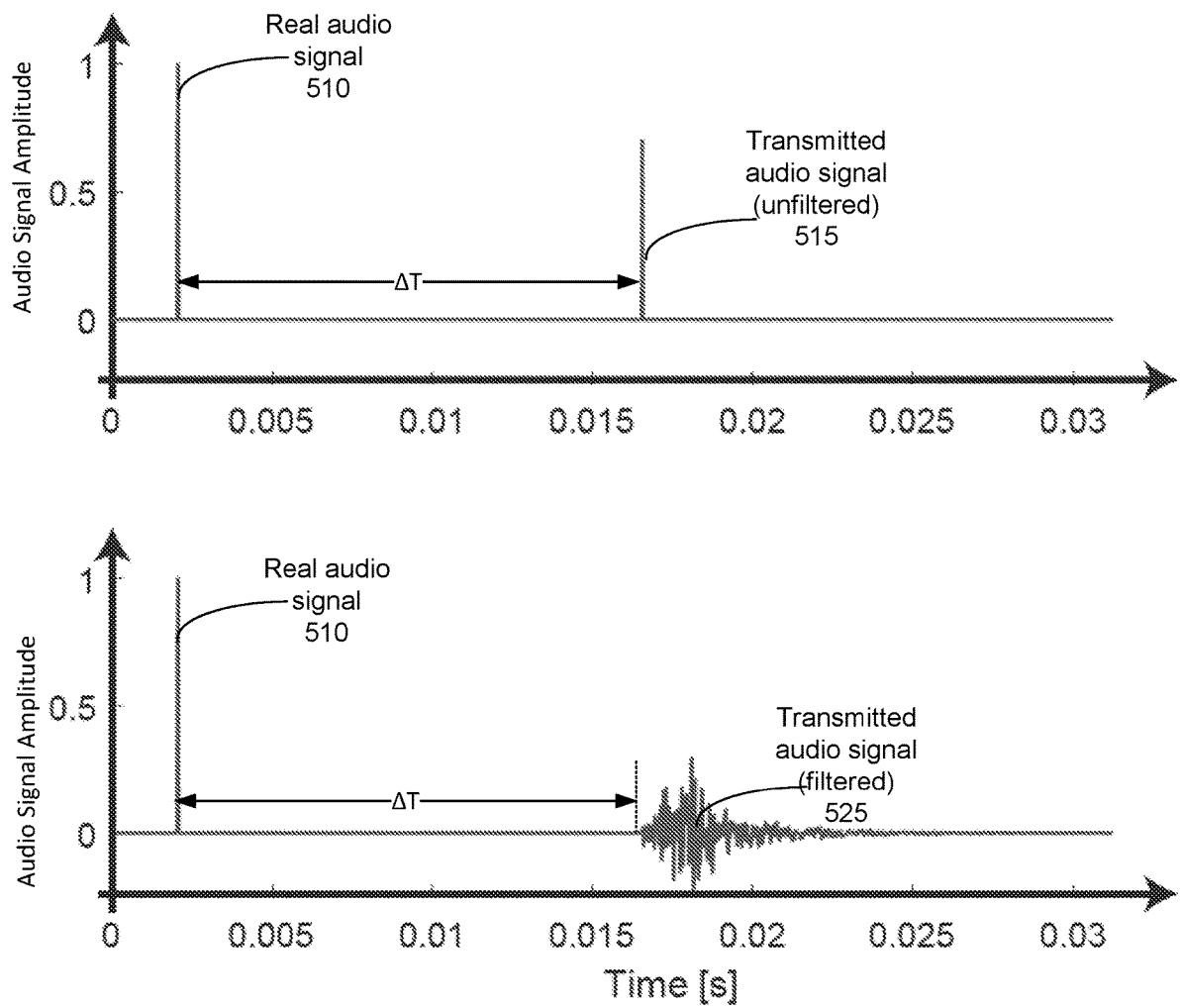
FIG. 5 illustrates a diagram of filtering a user audio signal, in accordance with one or more embodiments.

FIG. 5 illustrates a diagram of filtering the user audio signal, in accordance with one or more embodiments. FIG. 5 illustrates a first graph 505 showing audio signals that are measured at an opening of an ear canal of a first user. An audio system of the first user is in communication with an audio system of a second user over a shared communication channel. The audio signals include a real audio signal 510 and a transmitted audio signal 515. The real audio signal 510 corresponds to acoustic pressure waves that originate from the second user and are measured at the ear canal of the user (i.e., user hears the speech of the second user). The transmitted audio signal 515 corresponds to an unfiltered audio signal corresponding to speech of the second user that is recorded (e.g., as the second user's user audio signal), transmitted to the audio system of the first user, and played back to the first user through one or more speakers. Due to processing delays associated with recording, transmitting, processing, and playing back the transmitted audio signal, the transmitted audio 515 signal may be detected at the ear canal (i.e., audible to the user) after the real audio 510 by an amount of time corresponding to a processing delay $\Delta T$. If the processing delay $\Delta T$ a certain amount of time (e.g., 10-15 ms), the first user may hear the transmitted audio signal 515 as a separate auditory event as the real audio signal 510, which may produce an echo effect that is distracting to the first user.

The second graph 520 shows audio that is measured at the location of the first user when the transmitted audio is filtered using an all-pass filter to diffuse the audio signal. As illustrated in the second graph 520, the same real audio signal 510 is heard at the location of the first user. However, the transmitted audio signal has been filtered to produce the filtered transmitted audio signal 525 that comprises a plurality of diffuse reflections. Even though the filtered transmitted audio signal 525 is not heard until $\Delta T$ after the real audio 510, the diffusion of the transmitted audio signal 525 may cause the first user to interpret the real audio signal 510 and the filtered transmitted audio signal 525 as being part of the same auditory event, reducing or eliminating the undesirable echo effect. As such, by filtering the audio signal, a longer processing delay can be accommodated without producing an undesirable echo effect for the user. In some embodiments, the audio signal is filtered at the headset of the sending user prior to being transmitted to other users of the shared communication channel. In other embodiments, the audio signal is filtered at the headset of a user receiving the audio signal. In some embodiments where filtering is performing at the receiver side, the audio system of the receiving headset may determine a delay between the real audio and the transmitted audio, and adjust one or more filtering parameters (e.g., amount of dispersion) based upon the determined delay.

In some cases, the first and second users may be at a distance from each other such that the transmitted audio 525 is heard at the location of the first user before the real audio 510. In some embodiments, the audio system does not perform diffusing filtering on the transmitted audio if the sending user is determined to be at least a threshold distance away from the user.

In embodiments where the shared communication channel includes at least one remote user, the audio signals transmitted between remote and non-remote users do not need to undergo filtering, since the remote users cannot hear the real audio of the non-remote users (and vice versa), so no echo effect caused by processing delays is present. In addition, in some embodiments, the audio from the second user may not be filtered if a determination is made that the distance between the second user and first user is at least a threshold amount, or that there are certain structures (e.g., a wall) between the first and second users, such that the first user can be inferred to not be able to hear the real audio of the second user.

Channel Priority Levels

In some embodiments, different users on a shared communication channel may be given different priority levels. As used herein, a priority level of a user of the shared communication channel may indicate a level at which audio signals corresponding to speech of the user is reinforced relative to audio signals corresponding to other users, where audio signals from users having higher priority levels are positively reinforced relative to users of lower priority levels. In some embodiments, a shared communication channel may comprise a first set of users corresponding to a base priority level, and at least one user (e.g., a designated speaker or leader) associated with a high priority level that is given precedence over the base priority level.

For example, when a user associated with the high priority level (hereinafter referred to as a "priority user") is not speaking, audio signals received by a first user corresponding to users of the base priority level the shared communication channel may be processed normally (e.g., spatialized and reinforced based upon the relative positions of the users) as described above. However, after the priority user speaks, the audio signal corresponding to the priority user received by the first user is reinforced regardless of the relative positions of the first user and the priority user. In addition, audio signals from users of the base priority level may be attenuated during the time that the audio signal from the priority user is being played to the first user, in order to ensure that the first user is able to clearly hear the speech of the priority user.

In some embodiments, users of a shared communication channel can be organized into more than two different priority levels. Audio signals from users with higher priority levels with be reinforced relative to audio signals from users with lower priority levels, allowing for the user to more clearly hear speech by higher priority users when they are speaking. In some embodiments, each user of a shared communication channel may assign personalized priority levels to other users of the channel, based upon which of the other users they are most interested in paying attention to.

Process Flow

Figure 6:
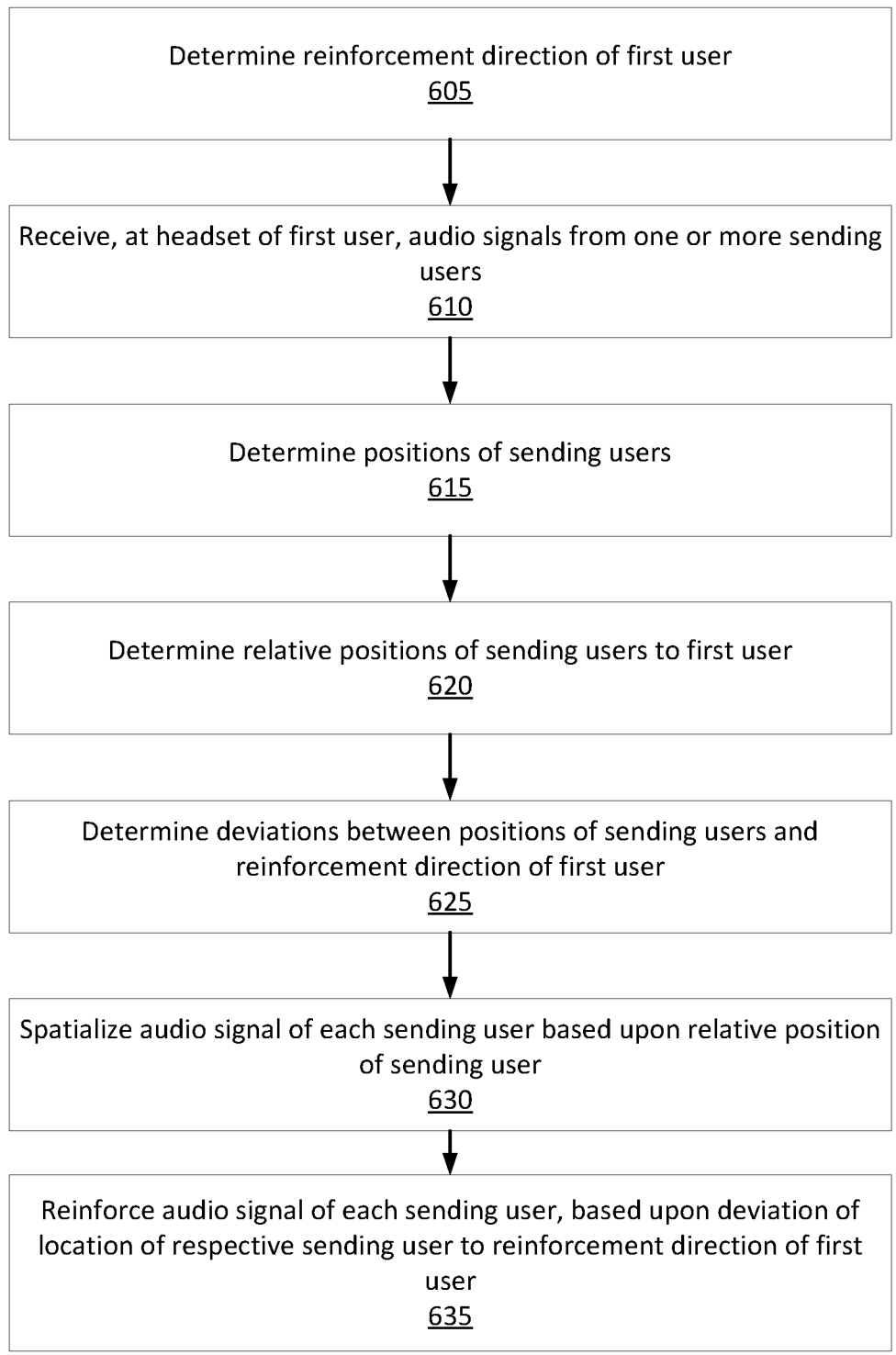
FIG. 6 is a flowchart of a process for spatializing and reinforcing received audio data from other users in a shared communication channel, in accordance with one or more embodiments.

FIG. 6 is a flowchart of a process for spatializing and reinforcing received audio data from other users in a shared communication channel, in accordance with one or more embodiments. The process may be performed by the headset that includes an audio system (e.g., the audio system 300). The headset of a first user participating in a shared communication channel (e.g., the headset 110 of the user 105 illustrated in FIG. 1, where the user 105 is part of the shared communication channel 120A). Other entities may perform some or all of the steps of the process in other embodiments (e.g., a console). Likewise, embodiments may include different and/or additional steps, or perform the steps in different orders.

The headset of the first user determines 605 a reinforcement direction of the first user. In some embodiments where the reinforcement direction corresponds to the gaze direction of the user, the headset comprises an eye tracking sensor and a position sensor for which to determine the gaze direction of the user. For example, the position sensor may determine a position and orientation of the headset, from which a position and orientation of the head of the first user can be inferred. In addition, the eye tracking sensor may be used to determine an orientation of the first user's eyes relative to their head. As such, the combination of the position sensor and eye tracking sensor can be used to determine a direction of the first user's gaze.

The headset receives 610 audio signals from one or more sending users of the shared communication channel (e.g., via a transceiver). The audio signal may correspond to speech of the sending user, and may include additional metadata such as an identity of the sending user, and data from which a position of the sending user can be determined.

The headset determines 615 positions associated with each of the sending users from which an audio signal was received. In some embodiments, the headset receives metadata associated with the audio signal indicating a position of the sending user (e.g., as determined by a position sensor on a headset of the sending user). In other embodiments, the headset receives a plurality of signals transmitted by a plurality of antenna (e.g., an antenna array) positioned at different locations on the sending user's headset. Based upon a phase or timing of the received signals, the headset can determine a relative position of the sending user to the first user.

The headset determines 620 relative positions of each of the sending users relative to the first user. The relative position of a sending user may indicate where the sending user is located relative to the first user (e.g., in front of the first user, to the left of the first user, etc.), based upon a head orientation of the first user.

The headset determines 625 a deviation between the position of each sending user and the reinforcement direction of the first user. The deviation indicates the position of the sending user relative to the reinforcement direction of the first user. In some embodiments, the headset controller may additionally determine a distance between the sending user and the first user.

The headset spatializes 630 the audio signals for each sending user, based upon the position of the respective sending user relative to the first user, such that the audio signal played to the first user through two or more speakers may sound as if originating from a particular location (e.g., the location of the sending user). In some embodiments, spatializing the audio signal comprises configuring an amplitude of the audio signal played through each of the speakers, such that the user is able to interpret the different amplitudes of the sound through the different speakers as corresponding to sound originating from a particular location.

The headset reinforces 635 the audio signals for each sending user, based upon the deviation of the position of the respective sending user to the reinforcement direction of the first user. In some embodiments, the audio signal for a sending user is reinforced if the deviation of the position of the sending user does not exceed a threshold amount. In some embodiments, the magnitude of reinforcement may be inversely proportional to an amount of deviation between the location of the sending user and the reinforcement direction of the first user. As such, audio signals from a sending user would be reinforced more strongly if the location of sending user was close to the reinforcement direction of the first user, compared to if the location of the sending user was further away from the reinforcement direction. In some embodiments, an amount of reinforcement may also be based upon a number of audio signals currently received from other sending users, a distance between the sending user and the first user, etc. In some embodiments, the reinforcement of an audio signal may comprise an attenuation of the audio signal (e.g., negative reinforcement).

As such, by spatializing and reinforcing audio signals received from other users in the shared communication channel, the user of the headset can more easily focus on the speech of other users that they are paying attention to, as well as allowing the user to have a sense of the locations of each of the other users from which audio signals are received. This allows the user to more clearly hear speech that they wish to pay attention to, even in noisy environments, while maintaining an awareness of other users in the environment.

Figure 7:
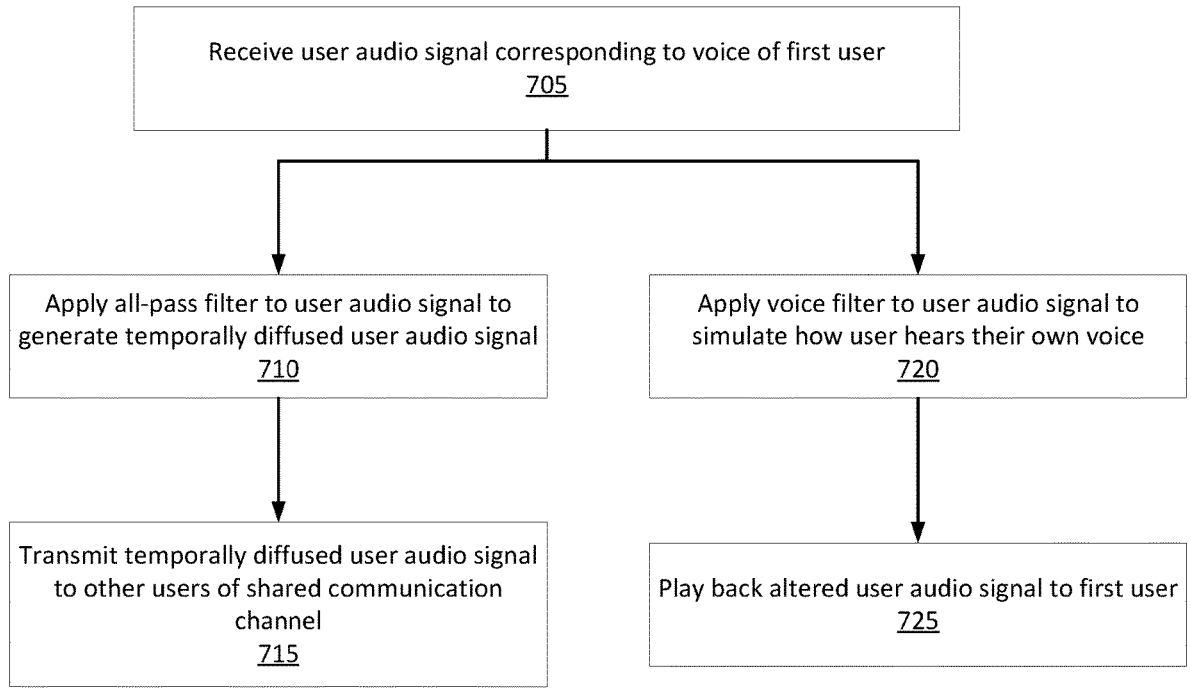
FIG. 7 is a flowchart of a process for processing audio signals corresponding to a user's voice, in accordance with one or more embodiments.

FIG. 7 is a flowchart of a process for processing audio signals corresponding to a user's voice, in accordance with one or more embodiments. The process may be performed by a headset that includes an audio system (e.g., the audio system 300). The headset of a first user participating in a shared communication channel (e.g., the headset 110 of the user 105 illustrated in FIG. 1, where the user 105 is part of the shared communication channel 120A). Other entities may perform some or all of the steps of the process in other embodiments (e.g., a console). Likewise, embodiments may include different and/or additional steps, or perform the steps in different orders.

The headset receives 705 a user audio signal corresponding to speech by the user of the headset. In some embodiments, the user audio signal is recorded by an acoustic sensor located near the user's mouth (e.g., the acoustic sensor 225). In some embodiments, the user audio signal is generated by a microphone array that uses beam forming to isolate and capture sounds from a particular region (e.g., near the user's mouth) in the local area.

The headset applies 710 one or more filters (e.g., an all-pass filter) to the user audio signal that temporally disperses the user audio signal to produce a diffused user audio signal.

The headset transmits 715 the diffused user audio signal to the headsets of other users in the shared communication channel. By temporally dispersing the user audio signal, an amount of processing delay between when another user hears the user's real speech and when they hear the transmitted user audio signal played to them through one or more speakers can be increased without causing the other user to hear the user audio signal as a separate auditory event, producing an undesirable echo effect.

In some embodiments, instead of temporally dispersing the user audio signal and transmitting the diffused user audio signals to the headsets of other users, temporally dispersion of audio signals is performed by the headset receiving the audio signal. In some embodiments, the user audio signal is temporally dispersed based upon one or more filtering parameters, which may be adjusted based upon the relative positions of or a distance between the headsets of the sending and receiving users.

The headset applies 720 a voice filter to the user audio signal to produce an altered version of the user audio signal.

The voice filter is configured to simulate the effect that the vibrations of a person's vocal chords that travel through the skull when the person is speaking effects how they hear their own voice. In some embodiments, the user can manually configure one or more parameters of the voice filter, in order for the altered user audio signal to more closely match how they hear their own voice.

The headset plays back 720 the altered user audio signal to the user (e.g., through one or more speakers), allowing the user to get a better sense of the current volume of their voice, such that they are able to better modulate their speaking volume.

Example of an Artificial Reality System

Figure 8:
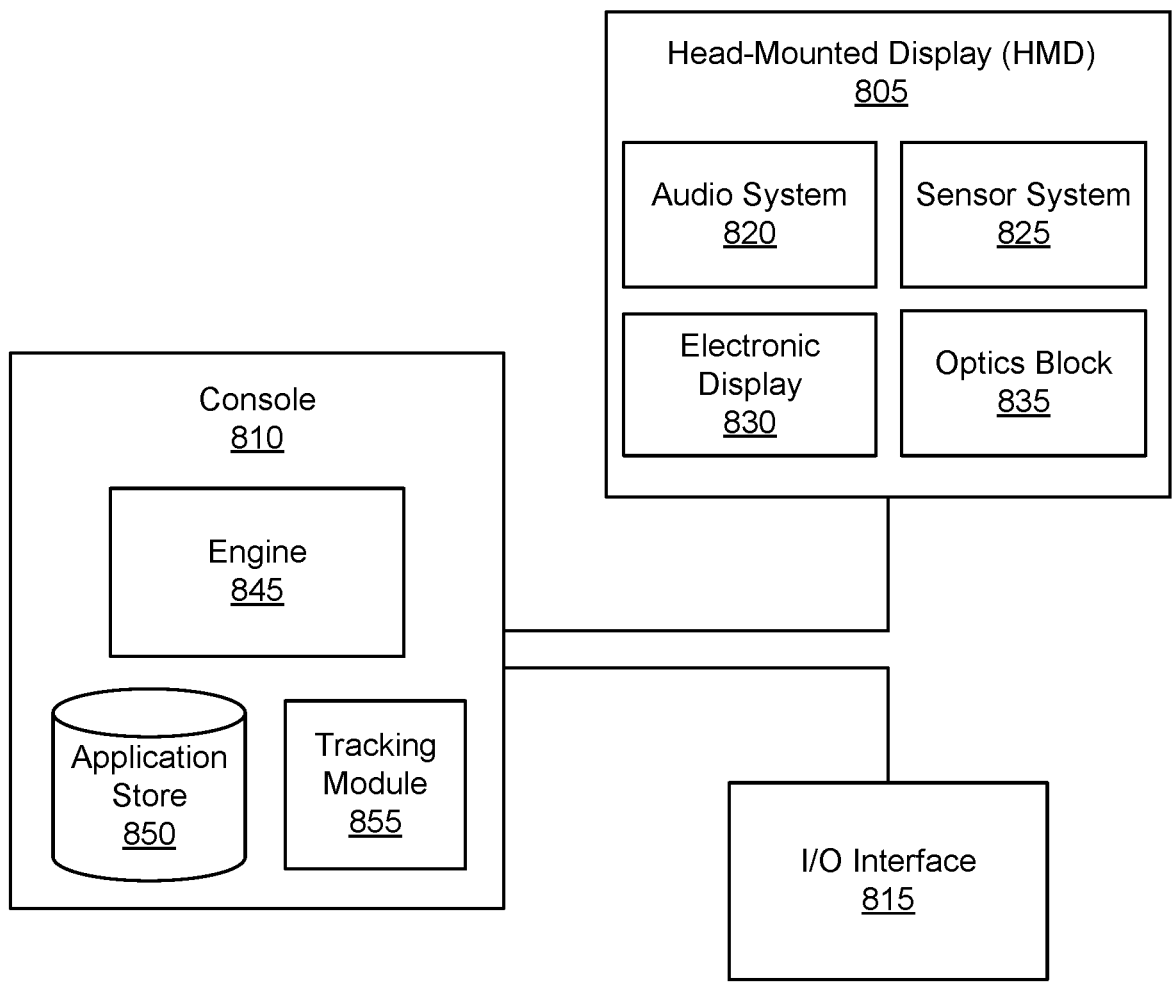
FIG. 8 is a system environment of a headset including audio system as described above, in accordance with one or more embodiments.

FIG. 8 is a system environment of a headset including audio system as described above, in accordance with one or more embodiments. The system 800 may operate in an artificial reality environment, e.g., a virtual reality, an augmented reality, a mixed reality environment, or some combination thereof. The system 800 shown by FIG. 8 comprises a headset 805 and an input/output (I/O) interface 815 that is coupled to a console 810. The headset 805 may be an embodiment of the headset 110. While FIG. 8 shows an example system 800 including one headset 805 and one I/O interface 815, in other embodiments, any number of these components may be included in the system 800. For example, there may be multiple headsets 805 each having an associated I/O interface 815 with each headset 805 and I/O interface 815 communicating with the console 810. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 810 is provided by the headset 805.

The headset 805 presents content to a user comprising augmented views of a physical, real-world environment with computer-generated elements (e.g., two dimensional (2D) or three dimensional (3D) images, 2D or 3D video, sound, etc.). The headset 805 may be an eyewear device or a head-mounted display. In some embodiments, the presented content includes audio content (e.g., audio signal received from other users of a shared communication channel).

The headset 805 includes an audio system 820, a sensor system 825, an electronic display 830, and an optics block 835. The audio system 820 may correspond to the audio system 300 described in FIG. 3, and may comprise a microphone assembly 225, transceiver 230, speaker assembly 330, and controller 215. The audio system 820 is configured to communicate with audio systems of other HMDs, capture an audio signal corresponding to speech of the user of the HMD 805, process received audio signals (e.g., from other HMDs), and play back processed audio signals to the user.

The sensor system 825 comprises one or more sensor modules, which may include a camera assembly 235, a position sensor 240, and an eye tracking sensor 245. The sensor modules may be used generate information of the local area around the HMD 805, as well as track a position of the HMD 805 and a gaze direction of the user of the HMD 805. In some embodiments, the sensors of the sensor system 825 may be used with the tracking module 855 to track a position of the HMD 805.

The electronic display 830 and the optics block 835 is one embodiment of a lens 210. Some embodiments of the headset 805 have different components than those described in conjunction with FIG. 8. Additionally, the functionality provided by various components described in conjunction with FIG. 8 may be differently distributed among the components of the headset 805 in other embodiments, or be captured in separate assemblies remote from the headset 805.

The electronic display 830 displays 2D or 3D images to the user in accordance with data received from the console 810. In various embodiments, the electronic display 830 comprises a single electronic display or multiple electronic displays (e.g., a display for each eye of a user). Examples of the electronic display 830 include: a liquid crystal display (LCD), an organic light emitting diode (OLED) display, an active-matrix organic light-emitting diode display (AMO-LED), waveguide display, some other display, or some combination thereof.

In some embodiments, the optics block 835 magnifies image light received from the electronic display 830, corrects optical errors associated with the image light, and presents the corrected image light to a user of the headset 805. In various embodiments, the optics block 835 includes one or more optical elements. Example optical elements included in the optics block 835 include: a waveguide, an aperture, a Fresnel lens, a convex lens, a concave lens, a filter, a reflecting surface, or any other suitable optical element that affects image light. Moreover, the optics block 835 may include combinations of different optical elements. In some embodiments, one or more of the optical elements in the optics block 835 may have one or more coatings, such as partially reflective or anti-reflective coatings.

Magnification and focusing of the image light by the optics block 835 allows the electronic display 830 to be physically smaller, weigh less, and consume less power than larger displays. Additionally, magnification may increase the field of view of the content presented by the electronic display 830. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 835 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 830 for display is pre-distorted, and the optics block 835 corrects the distortion when it receives image light from the electronic display 830 generated based on the content.

The I/O interface 815 is a device that allows a user to send action requests and receive responses from the console 810. An action request is a request to perform a particular action. For example, an action request may be an instruction to start or end capture of image or video data, or an instruction to perform a particular action within an application. The I/O interface 815 may include one or more input devices. Example input devices include: a keyboard, a mouse, a hand controller, or any other suitable device for receiving action requests and communicating the action requests to the console 810. An action request received by the I/O interface 815 is communicated to the console 810, which performs an action corresponding to the action request. In some embodiments, the I/O interface 815 includes one or more position sensors that capture calibration data indicating an estimated position of the I/O interface 815 relative to an initial position of the I/O interface 815. In some embodiments, the I/O interface 815 may provide haptic feedback to the user in accordance with instructions received from the console 810. For example, haptic feedback is provided when an action request is received, or the console 810 communicates instructions to the I/O interface 815 causing the I/O interface 815 to generate haptic feedback when the console 810 performs an action. The I/O interface 815 may monitor one or more input responses from the user for use in determining a perceived origin direction and/or perceived origin location of audio content.

The console 810 provides content to the headset 805 for processing in accordance with information received from one or more of: the headset 805 and the I/O interface 815. In the example shown in FIG. 8, the console 810 includes an application store 850, a tracking module 855 and an engine 845. Some embodiments of the console 810 have different modules or components than those described in conjunction with FIG. 8. Similarly, the functions further described below may be distributed among components of the console 810 in a different manner than described in conjunction with FIG. 8.

The application store 850 stores one or more applications for execution by the console 810. An application is a group of instructions, that when executed by a processor, generates content for presentation to the user. Content generated by an application may be in response to inputs received from the user via movement of the headset 805 or the I/O interface 815. Examples of applications include: gaming applications, conferencing applications, video playback applications, or other suitable applications. In some embodiments, the console 810 may function as an application server (e.g., the application server 130), and the applications may include an application for maintaining shared communication channels between groups of users (e.g., users of different HMDs 805).

The tracking module 855 calibrates the system environment 800 using one or more calibration parameters and may adjust one or more calibration parameters to reduce error in determination of the position of the headset 805 or of the I/O interface 815. Calibration performed by the tracking module 855 also accounts for information received from one or more sensor modules of the sensor system 825 in the headset 805 (e.g., a position sensor), or one or more sensors included in the I/O interface 815. Additionally, if tracking of the headset 805 is lost, the tracking module 855 may re-calibrate some or all of the system environment 800.

The tracking module 855 tracks movements of the headset 805 or of the I/O interface 815 using information from the one sensors (e.g., position sensor 240, camera assembly 235, or some combination thereof). For example, the tracking module 855 determines a position of a reference point of the headset 805 in a mapping of a local area based on information from the headset 805. The tracking module 855 may also determine positions of the reference point of the headset 805 or a reference point of the I/O interface 815 using data indicating a position of the headset 805 or using data indicating a position of the I/O interface 815 from one or more sensors included in the I/O interface 815, respectively. Additionally, in some embodiments, the tracking module 855 may use portions of data indicating a position or the headset 805 to predict a future position of the headset 805. The tracking module 855 provides the estimated or predicted future position of the headset 805 or the I/O interface 515 to the engine 845. In some embodiments, the tracking module 855 may provide tracking information to the audio system 820 for use in determining how to spatialize and/or reinforce received audio signals.

The engine 845 also executes applications within the system environment 800 and receives position information, acceleration information, velocity information, predicted future positions, or some combination thereof, of the headset 805 from the tracking module 855. Based on the received information, the engine 845 determines content to provide to the headset 805 for presentation to the user. For example, if the received information indicates that the user has looked to the left, the engine 845 generates content for the headset 805 that mirrors the user's movement in a virtual environment or in an environment augmenting the local area with additional content. Additionally, the engine 845 performs an action within an application executing on the console 810 in response to an action request received from the I/O interface 815 and provides feedback to the user that the action was performed. The provided feedback may be visual or audible feedback via the headset 805 or haptic feedback via the I/O interface 815.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A audio system comprising:
   a gaze determination circuit configured to determine a gaze direction of a first user of the audio system;
   a transceiver configured to receive an audio signal associated with an audio system of a second user;
   processing circuitry configured to:
      determine a position of the second user;
      determine a deviation between the position of the second user and a reinforcement direction of the first user based at least in part upon the gaze direction of the first user; and
      adjust an amplitude of the audio signal, based at least in part upon the determined deviation; and
   a speaker assembly configured to project a sound based upon the adjusted audio signal.

2. The audio system of claim 1, wherein the processing circuitry is further configured to spatialize the audio signal based upon the position of the second user relative to the first user.

3. The audio system of claim 2, wherein the processing circuitry is further configured to:
   determine a relative direction of the position of the second user relative to a head orientation of the first user;
   spatialize the audio signal based upon the relative direction.

4. The audio system of claim 2, wherein the processing circuitry is configured to spatialize the audio output signal based upon whether there is line of sight between the first user and the second user.

5. The audio system of claim 1, further comprising a microphone array comprising a plurality of microphones arranged in a plurality of different locations, the microphone array configured to capture sound in a local area of the first user and generate an audio input signal.

6. The audio system of claim 5, wherein the processing circuitry is further configured to:
   analyze the audio input signal to identify sounds originating from a particular region in the local area of the first user; and
   generate a user audio signal from the audio input signal by reinforcing a portion of the audio input signal corresponding to the sounds originating from the particular region.

7. The audio system of claim 1, wherein the transceiver is further configured to receive positional information of the second user.

8. The audio system of claim 1, further comprising an antenna array configured to determine a relative position of the second user relative to the first user.

9. The audio system of claim 1, wherein the receiver is further configured to receive a second audio signal from a third user, and the processing circuitry is further configured to:
   determine a deviation between a position of the third user and the reinforcement direction of the first user;
   compare the deviation associated with the third user to the deviation associated with the second user; and
   reinforce an amplitude of the second audio signal based upon a result of the comparison.

10. A method comprising:
    determining, at an audio system associated with a first user, a gaze direction of the first user;
    receiving, at the audio system, an audio signal associated with an audio system associated with a second user;
    identifying a position associated with the second user;
    determining a deviation between the position of the second user and a reinforcement direction of the first user, the reinforcement direction based at least in part upon the gaze direction of the first user;
    adjusting an amplitude of the audio signal, based at least in part upon the determined deviation; and
    projecting, at the audio system, a sound based upon the adjusted audio signal.

11. The method of claim 10, further comprising spatializing the audio signal based upon the position of the second user relative to the first user.

12. The method of claim 11, further comprising:
    determining a relative direction of the position of the second user relative to a head orientation of the first user;
    spatializing the audio signal based upon the relative direction.

13. The method of claim 11, wherein the audio signal is spatialized based upon whether there is line of sight between the first user and the second user.

14. The method of claim 10, further comprising:
    capturing, by a microphone array comprising a plurality of microphones arranged in a plurality of different locations, sound in a local area of the first user, and generating an audio input signal based on the captured sound.

15. The method of claim 14, further comprising:
    analyzing the audio input signal to identify sounds originating from a particular region in the local area of the first user; and
    generating a user audio signal from the audio input signal by reinforcing a portion of the audio input signal corresponding to the sounds originating from the particular region.

16. The method of claim 10, further comprising receiving positional information of the second user via a transceiver.

17. The method of claim 10, further comprising determining a relative position of the second user relative to the first user.

18. The method of claim 10, further comprising:
    receiving a second audio signal associated with a third user;
    determining a deviation between a position of the third user and the reinforcement direction of the first user;
    comparing the deviation associated with the third user to the deviation associated with the second user; and
    reinforcing an amplitude of the second audio signal based upon a result of the comparison.

19. A non-transitory computer-readable medium storing instructions that, when executed by one or more processors, cause the one or more processors to perform operations comprising:
- determining, at an audio system associated with a first user, a gaze direction of the first user;
- receiving, at the audio system, an audio signal associated with an audio system associated with a second user;
- identifying a position associated with the second user;
- determining a deviation between the position of the second user and a reinforcement direction of the first user, the reinforcement direction based at least in part upon the gaze direction of the first user;
- adjusting an amplitude of the audio signal, based at least in part upon the determined deviation; and
- projecting, at the audio system, a sound based upon the adjusted audio signal.

20. The non-transitory computer-readable medium of claim 19, further comprising:
- determining a relative direction of the position of the second user relative to a head orientation of the first user;
- spatializing the audio signal based upon the determined relative direction.

* * * * *